(12) United States Patent
Wagner et al.

(10) Patent No.: US 12,393,026 B2
(45) Date of Patent: *Aug. 19, 2025

(54) HEADS-UP DISPLAY AND COATING THEREFOR

(71) Applicant: Vitro Flat Glass LLC, Cheswick, PA (US)

(72) Inventors: Andrew V. Wagner, Pittsburgh, PA (US); Zhixun Ma, Richmond, CA (US); Dennis J. O'Shaughnessy, Allison Park, PA (US); Adam D. Polcyn, Pittsburgh, PA (US)

(73) Assignee: Vitro Flat Glass LLC, Cheswick, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,284

(22) Filed: Jan. 8, 2024

(65) Prior Publication Data

US 2024/0176138 A1 May 30, 2024

Related U.S. Application Data

(63) Continuation of application No. 18/163,530, filed on Feb. 2, 2023, now Pat. No. 11,906,733, which is a
(Continued)

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/10229* (2013.01);
(Continued)

(58) Field of Classification Search
CPC ............ G02B 27/0101; G02B 27/0018; G02B 27/288; G02B 5/0875; G02B 5/3066;
(Continued)

(56) References Cited

U.S. PATENT DOCUMENTS 5,053,755 A 10/1991 Smith et al.
5,143,796 A 9/1992 Sebastiano et al.
(Continued)

FOREIGN PATENT DOCUMENTS

CN 101808821 A 8/2010
CN 104267498 A 1/2015
(Continued)

OTHER PUBLICATIONS

Amtsblatt der Europ ischen Union, L 230/119: Regelung Nr. 43 der Wirt-schaftskommission der Vereinten Nalionen tar Europa (UN/ECE)—Ein-heitliche Bedingungen tor die Genehmigung der Sicherheilsverglasungs-werkstoffe und ihres Einbaus in Fahrzeuge Veröffentlichungsdatum: Aug. 31, 2010. [Relevant for reasons listed on the English Translation of the Opposition by Saint Gobain].
(Continued)

*Primary Examiner* — Wyatt A Stoffa
*Assistant Examiner* — Grant A Gagnon
(74) *Attorney, Agent, or Firm* — The Webb Law Firm

(57) ABSTRACT

A laminate including: a first ply having a first surface and a second surface, where the first surface is an outer surface of the laminate; a second ply having a third surface facing the second surface and a fourth surface opposite the third surface, where the fourth surface is an inner surface of the laminate; an interlayer between the plies; and an enhanced p-polarized reflective coating positioned over at least a portion of a surface of the plies. When the laminate is contacted with radiation having p-polarized radiation at an angle of 60° relative to normal of the laminate, the laminate
(Continued)

exhibits a LTA of at least 70% and a reflectivity of the p-polarized radiation of at least 10%. A display system and method of projecting an image in a heads-up display is also disclosed.

23 Claims, 9 Drawing Sheets

Related U.S. Application Data continuation of application No. 16/989,188, filed on Aug. 10, 2020, now Pat. No. 11,630,301, which is a continuation of application No. 16/111,496, filed on Aug. 24, 2018, now Pat. No. 10,788,667.

(60) Provisional application No. 62/552,467, filed on Aug. 31, 2017.

(51) Int. Cl.
*G02B 27/00* (2006.01)
*G02B 27/28* (2006.01)
*G02B 5/08* (2006.01)
*G02B 5/30* (2006.01)

(52) U.S. Cl.
CPC .. *B32B 17/10568* (2013.01); *B32B 17/10761* (2013.01); *G02B 27/0018* (2013.01); *G02B 27/288* (2013.01); *G02B 5/0875* (2013.01); *G02B 5/3066* (2013.01); *G02B 5/3083* (2013.01); *G02B 2027/011* (2013.01); *G02B 2027/012* (2013.01); *G02B 2027/0194* (2013.01); *G02B 27/283* (2013.01)

(58) Field of Classification Search
CPC ................ G02B 5/3083; G02B 27/283; G02B 2027/011; B32B 17/10036; B32B 17/10229; B32B 17/10568; B32B 17/10761
USPC ........................................................ 359/630
See application file for complete search history.

(56) References Cited

U.S. PATENT DOCUMENTS

| | | | |
|---|---|---|---|
| 5,718,980 A | 2/1998 | Koch et al. |
| 5,935,702 A | 8/1999 | Macquart et al. |
| 6,265,076 B1 | 7/2001 | McCurdy et al. |
| 6,327,084 B1 | 12/2001 | Nishikawa et al. |
| 6,327,089 B1 | 12/2001 | Hosaki et al. |
| 6,570,709 B2 | 5/2003 | Katayama et al. |
| 6,833,194 B1 | 12/2004 | O'Shaughnessy |
| 6,952,312 B2 | 10/2005 | Weber et al. |
| 7,123,418 B2 | 10/2006 | Weber et al. |
| 8,792,177 B2 | 7/2014 | Nakamura et al. |
| 9,658,453 B1 | 5/2017 | Kress et al. |
| 9,933,619 B2 | 4/2018 | Watano et al. |
| 10,345,499 B2 | 7/2019 | Medwick et al. |
| 10,437,054 B2 | 10/2019 | Tso et al. |
| 2003/0012963 A1 | 1/2003 | Ebisawa et al. |
| 2003/0169213 A1 | 9/2003 | Spero |
| 2006/0023315 A1 | 2/2006 | Robinson |
| 2006/0165963 A1 | 7/2006 | Fleury et al. |
| 2007/0264479 A1 | 11/2007 | Thiel et al. |
| 2009/0153962 A1 | 6/2009 | Okada et al. |
| 2009/0303604 A1 | 12/2009 | Martin |
| 2015/0316765 A1 | 11/2015 | Kim et al. |
| 2017/0059753 A1 | 3/2017 | Wagner et al. |
| 2017/0219818 A1 | 8/2017 | Fang et al. |
| 2017/0242247 A1 | 8/2017 | Tso et al. |
| 2017/0343806 A1 | 11/2017 | Anzai et al. |
| 2018/0015876 A1 | 1/2018 | Yamagata et al. |

FOREIGN PATENT DOCUMENTS

| | | | |
|---|---|---|---|
| CN | 104267499 A | 1/2015 |
| CN | 106646874 A | 5/2017 |
| DE | 3739211 A1 | 5/1988 |
| DE | 102014220189 A1 | 4/2016 |
| EP | 0836108 A2 | 4/1998 |
| EP | 0844507 A1 | 5/1998 |
| EP | 3187917 A2 | 7/2017 |
| EP | 3264160 A1 | 1/2018 |
| JP | H10115802 A | 5/1998 |
| JP | 2000103655 A | 4/2000 |
| JP | 2000229381 A | 8/2000 |
| JP | 2005516818 A | 6/2005 |
| JP | 2009534246 A | 9/2009 |
| JP | 2009556607 A | 10/2009 |
| JP | 2017132666 A | 8/2017 |
| MX | 04012960 A | 5/2005 |
| WO | 2005010569 A2 | 2/2005 |
| WO | 2005017600 A1 | 2/2005 |
| WO | 2007015861 A2 | 2/2007 |
| WO | 2012140098 A1 | 10/2012 |
| WO | 2013104438 A1 | 7/2013 |
| WO | 2013190959 A1 | 12/2013 |
| WO | 2014079567 A1 | 5/2014 |
| WO | 2016058474 A2 | 4/2016 |
| WO | 2016126758 A1 | 8/2016 |
| WO | 2016133187 A1 | 8/2016 |
| WO | 2017198363 A1 | 11/2017 |

OTHER PUBLICATIONS

Wikipedia-Artikel, "Normlicht" (https://de.wikipedia.org/wiki/Normlicht, aufgerufen am Jun. 29, 2022).[Relevant for reasons listed on the English Translation of the Opposition by Saint Gobain].

Wikipedia-Artikel, "CIE-Normvalenzsystem" (https://de.wikipedia.org/wiki/CIE-Normvalenzsystem, aufgerufen am Jun. 29, 2022). [Relevant for reasons listed on the English Translation of the Opposition by Saint Gobain].

Konica Minolta, Lichtarten und Lichtquellen (https://www5.konicaminolta.eu/fileadmin/contenVeu/Measuring_Instruments/4_Learning_Centre/L_D/Light_sources_and_illuminants/Apps_Note_1_-_Lichtarten_und_Lichtquellen.pdf, aufgerufen am Jun. 29, 2022). [Relevant for reasons listed on the English Translation of the Opposition by Saint Gobain].

Wikipedia-Artikel, "Polarisationsfilter" (https://de.wikipedia.org/wiki/Polarisationsfilter, aufgerufen am Jun. 30, 2022). [Relevant for reasons listed on the English Translation of the Opposition by Saint Gobain].

H. Stocker (Hrsg.): Taschenbuch der Physik. Thun/Frankfurt am Main: Verlag Harri Deutsch, 4. Auflage (2000) Abschnitt 12.5.8 Polarisation des Lichts. [Relevant for reasons listed on the English Translation of the Opposition by Saint Gobain].

Wikipedia-Artikel, "Brewster-Winkel" (https://de.wikipedia.org/wiki/Brewster-Winkel, 1ufgerufen am Jul. 4, 2022). [Relevant for reasons listed on the English Translation of the Opposition by Saint Gobain].

HEADS-UP DISPLAY AND COATING THEREFOR

CROSS-REFERENCE TO RELATED APPLICATIONS

The present application is a continuation of U.S. patent application Ser. No. 18/163,530 filed Feb. 2, 2023, which is a continuation of U.S. patent application Ser. No. 16/989,188 filed Aug. 10, 2020, which issued on Apr. 18, 2023 as U.S. Pat. No. 11,630,301, which is a continuation of U.S. patent application Ser. No. 16/111,496, filed Aug. 24, 2018, which issued on Sep. 29, 2020 as U.S. Pat. No. 10,788,667, which claims priority to and the full benefit of U.S. Provisional Patent Application No. 62/552,467, filed on Aug. 31, 2017; the disclosures of which are hereby incorporate by reference in their entirety.

BACKGROUND OF THE INVENTION

Field of the Invention

The present invention relates to a laminate having enhanced p-polarized radiation reflecting properties, a display system for projecting an image, and a method of projecting an image in a heads-up display.

Description of Related Art

Conventional automotive heads-up displays (HUDs) use an electromagnetic radiation source in the dashboard that projects light up onto the windshield, which is then reflected to the driver's eyes, creating a virtual image of vehicle data so that the driver has access to information about the vehicle's operation without having to look away from the road. For electromagnetic radiation reflecting off of the windshield at angles typically found in a conventional vehicle, and a typical unpolarized light source, such as a light emitting diode (LED), the reflected light primarily is s-polarized, with a much smaller component of the light being p-polarized. In the extreme case, if the angle of incidence of the electromagnetic radiation to the windshield is the Brewster's angle of an air to glass interface (approximately 57°), the p-polarized reflectance is zero percent.

Light from the radiation source (primarily s-polarized) will reflect off of both the innermost surface of the windshield and the outermost surface of the windshield due to the index mismatch between air and glass. This leads to two reflected images being formed, one from each surface. Multiple images formed in a HUD is a phenomenon referred to as "ghosting", and eliminating or minimizing the presence of "ghosts" is a goal of HUD technology. A conventional method of resolving ghosting is by employing a wedge-shaped vinyl layer between the inner and outer glass plies of the windshield to adjust the geometry of the two glass plies to align the two reflected images. This wedge-shaped vinyl increases the cost of the windshield and also increases the complexity of manufacturing the windshield.

It is also desirable to apply a coating to at least one of the glass plies to provide solar control, heating, and/or antenna functionality to the windshield. This additional coating leads to a third index mismatch within the windshield, which leads to a third reflection, and a third reflected image on the HUD system, which is difficult to be compensated for by the wedge-shaped vinyl layer.

Another problem with conventional HUD systems results from the fact that many drivers wear polarized sunglasses to reduce glare from the road and other sources while driving. Typical polarized sunglasses work by blocking s-polarized radiation. P-polarized radiation is able to pass through the polarized sunglasses. However, as mentioned above, in conventional HUD systems, s-polarized radiation is primarily what reflects off of the windshield to form the image of the HUD, and very little p-polarized radiation is reflected off of the windshield surfaces. This is especially true considering the windshield is typically positioned at an angle near the Brewster's angle for the air to glass interface. Thus, a driver wearing conventional polarized sunglasses may not be able to see the image of the HUD formed by the primarily s-polarized radiation.

Therefore, there is a need in the art for a system and/or components to reduce or eliminate one or more of these problems. For example, it would be desirable to provide a HUD system that projects an image viewable to drivers wearing polarized sunglasses and/or that reduces or eliminates ghosting.

SUMMARY OF THE INVENTION

The present invention is directed to a laminate, such as a windshield, having enhanced p-polarized radiation reflecting properties. The laminate includes a first ply having a first surface (No. 1 surface) and a second surface (No. 2 surface) opposite the first surface, where the first surface is an outer surface of the laminate; a second ply having a third surface (No. 3 surface) facing the second surface and a fourth surface (No. 4 surface) opposite the third surface, where the fourth surface is an inner surface of the laminate. An interlayer is located between the first ply and the second ply. An enhanced p-polarized reflective coating of the invention is located over at least a portion of at least one of the surfaces of the first ply and/or the second ply. When the laminate is contacted with radiation from a radiation source, the radiation having p-polarized radiation, at an angle of 60° relative to normal of the laminate, the laminate exhibits a luminous transmittance using standard illuminate A (LTA) value of at least 70% and a reflectivity of the p-polarized radiation of at least 5%, such as at least 10%.

The enhanced p-polarized reflective coating may include a plurality of layers. The enhanced p-polarized reflective coating may be positioned over at least a portion of the second surface or the third surface. The enhanced p-polarized reflective coating may include: a base layer positioned over the portion of the at least one of the surfaces; a first metal functional layer positioned over at least a portion of the base layer; a first sacrificial metal layer positioned over at least a portion of the first metal functional layer; a first phase adjustment layer positioned over at least a portion of the first sacrificial metal layer; a second metal functional layer positioned over at least a portion of the first phase adjustment layer; a second sacrificial metal layer positioned over at least a portion of the second metal functional layer; a topcoat layer positioned over at least a portion of the second sacrificial metal layer; and an overcoat positioned over at least a portion of the topcoat layer. The enhanced p-polarized reflective coating may further include: a second phase adjustment layer positioned over at least a portion of the second sacrificial metal layer; a third metal functional layer positioned over at least a portion of the second phase adjustment layer; a third sacrificial metal layer positioned over at least a portion of the third metal functional layer; the topcoat layer positioned over at least a portion of the third sacrificial metal layer; and the overcoat positioned over at least a portion of the topcoat layer.

The base layer may include: a first film including a metal alloy oxide film; and a second film positioned over the first film of the base layer, the second film of the base layer including an oxide film. The first film of the base layer may include a zinc/tin alloy oxide, particularly zinc stannate. The second film of the base layer may include a metal oxide film, particularly zinc oxide. In one example, the base layer may have a thickness in the range of 300-500 angstroms, preferably 350-430 angstroms. In another example, the base layer may have a thickness in the range of 350-550 angstroms, preferably 420-500 angstroms.

The first phase adjustment layer and/or the second phase adjustment layer may include: a first film including an oxide film; a second film positioned over the first film of the first phase adjustment layer and/or the second phase adjustment layer, the second film of the first phase adjustment layer and/or the second phase adjustment layer including a metal alloy oxide film; and a third film positioned over the second film of the first phase adjustment layer and/or the second phase adjustment layer, the third film of the first phase adjustment layer and/or the second phase adjustment layer including an oxide film. The first film of the first phase adjustment layer and/or the second phase adjustment layer and/or the third film of the first phase adjustment layer and/or the second phase adjustment layer may include a metal oxide film, particularly zinc oxide. The second film of the first phase adjustment layer and/or the second phase adjustment layer may include a zinc/tin alloy oxide, particularly zinc stannate. In one example, the first phase adjustment layer may have a thickness in the range of 700-1,100 angstroms, preferably 850-1,050 angstroms. In another example, the first phase adjustment layer may have a thickness in the range of 600-1000 angstroms, preferably 675-875 angstroms. The second phase adjustment layer may have a thickness in the range of 500-1,000 angstroms, preferably 600-850 angstroms.

The first metal functional layer, the second metal functional layer, and/or the third metal functional layer may include at least one noble or near noble metal, particularly selected from silver, gold, platinum, palladium, osmium, iridium, rhodium, ruthenium, copper, mercury, rhenium, aluminum, and combinations thereof, more particularly metallic silver. The first metal functional layer may have a thickness in the range of 10-200 angstroms, preferably 50-150 angstroms. The first metal functional layer may have a thickness in the range of 10-150 angstroms, preferably 50-110 angstroms. The second metal functional layer may have a thickness in the range of 10-150 angstroms, preferably 50-125 angstroms. The second metal functional layer may have a thickness in the range of 10-100 angstroms, preferably 50-75 angstroms. The third metal functional layer may have a thickness in the range of 50-200 angstroms, preferably 75-150 angstroms.

The first sacrificial metal layer, the second sacrificial metal layer, and/or the third sacrificial metal layer may include at least one of titanium, niobium, tungsten, nickel, chromium, iron, tantalum, zirconium, aluminum, silicon, indium, tin, zinc, molybdenum, hafnium, bismuth, vanadium, manganese, and combinations thereof, particularly titanium. The first sacrificial metal layer, the second sacrificial metal layer, and/or the third sacrificial metal layer may have a thickness in the range of 10-50 angstroms, preferably 20-40 angstroms, more preferably 25-35 angstroms.

The topcoat layer may include: a first film including an oxide film; and a second film positioned over the first film of the topcoat layer, the second film of the topcoat layer including a metal-alloy oxide film. The first film of the topcoat layer may include a metal oxide film, particularly zinc oxide. The second film of the topcoat layer may include a zinc/tin alloy oxide, particularly zinc stannate. The topcoat layer may have a thickness in the range of 300-400 angstroms, preferably 340-375 angstroms. The topcoat layer may have a thickness in the range of 275-450 angstroms, preferably 300-415 angstroms.

The overcoat may include a combination silica and alumina coating. The overcoat may have a thickness in the range of 100-1,000 angstroms, preferably 600-800 angstroms.

The laminate 12 may further include an anti-reflective coating positioned over at least a portion of the first surface or the fourth surface. The anti-reflective coating may be positioned over at least a portion of the first surface or the fourth surface. The first ply and the second ply may be non-parallel relative to one another. The interlayer may be a wedge-shaped interlayer. The interlayer may be a layer of uniform thickness. The interlayer may include polyvinyl butyral (PVB). When contacted with the radiation from the radiation source, at an angle of 60° relative to normal of the laminate, the laminate may exhibit a total reflectivity of up to 60%, preferably up to 55%, more preferably up to 52%. The laminate may be an automotive laminate.

The present invention is also directed to a display system for projecting an image including a laminate having enhanced p-polarized radiation reflecting properties. The laminate includes: a first ply having a first surface and a second surface opposite the first surface, where the first surface is an outer surface of the laminate; a second ply having a third surface facing the second surface and a fourth surface opposite the third surface, where the fourth surface is an inner surface of the laminate; an interlayer positioned between the first ply and the second ply; and an enhanced p-polarized reflective coating positioned over at least a portion of at least one of the surfaces of the first ply and/or the second ply. When the laminate is contacted with radiation from a radiation source, the radiation having p-polarized radiation, at an angle of 60° relative to normal of the laminate, the laminate exhibits a luminous transmittance using standard illuminate A (LTA) value of at least 70% and a reflectance of the p-polarized radiation of at least 10%. The display system also includes a radiation source directed at the laminate, the radiation source emitting radiation having p-polarized radiation.

The system may further include a polarized filter positioned between the radiation source and the laminate and may be configured to allow at least a portion of the p-polarized radiation to pass therethrough. The polarized filter may filter at least a portion of s-polarized radiation emitted from the radiation source. The polarized filter may filter substantially all of the s-polarized radiation emitted from the radiation source. The radiation source may emit the radiation directed at the laminate such that an image is projected to an area of an inner side of the laminate. The image may be at least one of: a static image or a dynamic image. The image may include a color. The image may be an image in a heads-up display. The laminate may be an automotive laminate, such as an automotive windshield. The enhanced p-polarized reflective coating may be positioned over at least a portion of the second surface or a portion of the third surface. The enhanced p-polarized reflective coating may be positioned over at least a portion of the first surface or a portion of the fourth surface. The enhanced p-polarized reflective coating may be positioned over at least a portion of the fourth surface, and the radiation source directed at the laminate may be positioned at an angle relative to the laminate such that the radiation contacts the first surface at an angle substantially equal to a Brewster's angle for a first surface-air interface.

The present invention is also directed to a method of projecting an image in a heads-up display including providing a laminate having enhanced p-polarized radiation reflecting properties. The laminate includes: a first ply having a first surface and a second surface opposite the first surface, where the first surface is an outer surface of the laminate; a second ply having a third surface facing the second surface and a fourth surface opposite the third surface, where the fourth surface is an inner surface of the laminate; an interlayer located between the first ply and the second ply; and an enhanced p-polarized reflective coating positioned over at least a portion of at least one of the surfaces of the first ply and/or the second ply. When the laminate is contacted with radiation from a radiation source, the radiation having p-polarized radiation, at an angle of 60° relative to normal of the laminate, the laminate exhibits a luminous transmittance using standard illuminate A (LTA) value of at least 70% and a reflectivity of the p-polarized radiation of at least 10%. The laminate also includes directing the radiation source, emitting the radiation having p-polarized radiation, at the laminate, such that an image is projected to an area of an inner side of the laminate.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE INVENTION

Figure 1:
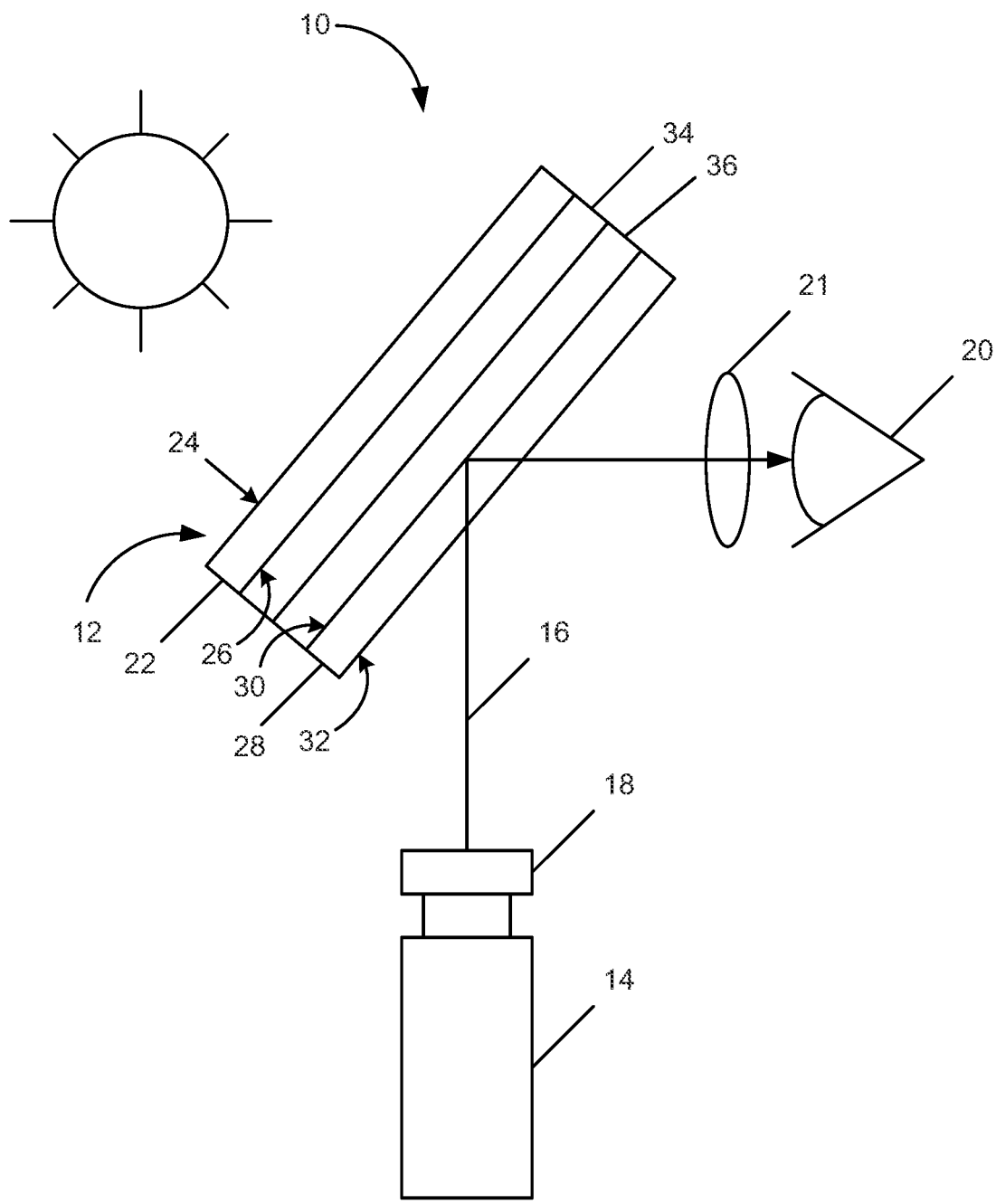
FIG. 1 is a perspective view (not to scale) of a display system including a laminate and a radiation source.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

For purposes of the following detailed description, it is to be understood that the invention may assume various alternative variations and step sequences, except where expressly specified to the contrary. Moreover, other than in any operating examples, or where otherwise indicated, all numbers used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

With respect to coating layers described herein, the term "over" means farther from the substrate on which the coating layer is positioned. For example, a second layer positioned "over" a first layer means that the second layer is positioned farther from the substrate than is the first layer. The second layer may be in direct contact with the first layer. Alternatively, one or more other layers may be positioned between the first layer and the second layer.

The term "film" means a region having a distinct composition. A "layer" may include one or more "films". A "coating" may include one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 300 nm. The term "visible radiation" means electromagnetic radiation having a wavelength in the range of 380 nm to 780 nm. The term "infrared radiation" means electromagnetic radiation having a wavelength in the range of greater than 780 nm to 100,000 nm. The term "solar infrared radiation" means electromagnetic radiation having a wavelength in the range of 1,000 nm to 3,000 nm. The term "thermal infrared radiation" means electromagnetic radiation having a wavelength in the range of greater than 3,000 nm to 20,000 nm.

The terms "metal" and "metal oxide" include silicon and silica, respectively, as well as traditionally recognized metals and metal oxides, even though silicon conventionally may not be considered a metal.

By "at least" is meant "greater than or equal to". By "not greater than" is meant "less than or equal to".

The term "includes" is synonymous with "comprises".

A "reference laminated unit" is defined as a laminate having two pieces of 2 mm clear float glass separated by a 0.76 mm layer of PVB with the enhanced p-polarized reflective coating on the No. 3 surface. By "reference laminated value" is meant the reported value, e.g., LTA, reflectance, etc., measured for the laminated unit using the test apparatus shown in FIG. 7.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

Display System

Referring to FIG. 1, a display system 10 according to the present invention is shown. The display system 10 may be a heads-up display (HUD) in a vehicle, such as a heads-up display in an automobile or aircraft. However, the display system 10 is not limited to heads-up displays in vehicles, and may be any type of display projecting an image. Non-limiting examples of displays that may be considered the "display system" include advertising, promotional, or informational displays, and the like. The display system 10 may project an image visible to humans (e.g., within the visible spectrum). Alternatively, the display system 10 may project an image in a non-visible region of the electromagnetic spectrum.

With continued reference to FIG. 1, the display system 10 may include a laminate 12 and a radiation source 14. The radiation source 14 may emit electromagnetic radiation 16. The radiation source 14 may emit radiation 16 across the entire radiation spectrum, or across only a portion thereof (e.g., across the visible spectrum, ultra violet radiation, infrared radiation, and the like, as well as combinations thereof). The radiation source 14 may emit white light as the radiation 16. The radiation 16 may include s-polarized radiation and/or p-polarized radiation. By "s-polarized radiation" it is meant that the radiation 16 has an electric field normal to the plane of incidence. By "p-polarized radiation" it is meant that the radiation 16 has an electric field along the plane of incidence. "Angle of incidence" is defined as the angle between a ray of radiation incident on a surface to a line normal to the surface at the point of incidence. The radiation source 14 may emit radiation 16 directed at the laminate 12 such that the radiation 16 contacts the laminate 12 at least one point.

With continued reference to FIG. 1, the display system 10 may further include a polarized filter 18. The polarized filter 18 may be positioned between the radiation source 14 and the laminate 12. The polarized filter 18 may allow at least a portion of the p-polarized and/or the s-polarized radiation to pass therethrough. The polarized filter 18 may only allow p-polarized radiation to pass therethrough. The polarized filter 18 may filter at least a portion of the s-polarized radiation, such that the filtered portion cannot pass therethrough. The polarized filter 18 may filter substantially all of the s-polarized radiation, such that substantially all of the s-polarized radiation cannot pass therethrough. Substantially all, in this context, means that the polarized filter 18 filters at least 95% of the s-polarized radiation, such as at least 97%, at least 99%, or 100% of the s-polarized radiation.

With continued reference to FIG. 1, the radiation source 14 may emit radiation 16 that directs off of the laminate 12, such that at least a portion of the radiation 16 is reflected off of the laminate 12 and is directed to an eye 20 of a user. The portion of the radiation not reflected off of the laminate 12, may be refracted, absorbed, or otherwise transmitted through the laminate 12. The user may be wearing polarized sunglasses 21, and the radiation 16 directed to the eye 20 of the user may be directed toward the polarized sunglasses 21. The polarized sunglasses 21 may filter s-polarized radiation such that at least a portion of the s-polarized radiation cannot pass therethrough.

With continued reference to FIG. 1, when the radiation source 14 emits the radiation 16 directed at the laminate 12, an image may be projected to an area on an inner side of the laminate 12, and the image may be viewable to the eye 20 of the user. The image of the display system 10 may be static or dynamic. The image may include colors and may be a monochromatic image or a polychromatic image. The image may be an image in a HUD. The HUD may be a HUD in an automobile or other vehicle. In this example, the laminate 12 may be a windshield, or other laminate 12 in the vehicle, and the radiation source 14 may be directed at the laminate 12 to display an image so that the driver (or other user) may see the image while operating the vehicle.

Laminate

Referring to FIG. 1 and FIGS. 2A-2F, various examples of laminates 12 of the present invention are shown. The laminate 12 may include a first ply 22 having a first surface 24 (No. 1 surface) and an opposite second surface 26 (No. 2 surface). The laminate 12 may also include a second ply 28 having a third surface 30 (No. 3 surface) and an opposite fourth surface 32 No. 4 surface). This numbering of the surfaces is in keeping with standard practice in the art. The second surface 26 may be facing the third surface 30, and an interlayer 34 may be positioned between the second surface 26 and the third surface 30. Referring to FIG. 1, the first surface 24 may be an outer surface of the laminate 12, and the fourth surface 32 may be an inner surface of the laminate 12. In the case of the laminate 12 being a windshield of a vehicle, the first surface 24 may be the surface closest to the sun, while the fourth surface 32 may be the surface closest to an interior of the vehicle. In this way, the fourth surface 32 may be the surface of the laminate 12 closest to the radiation source 14 positioned inside the vehicle and directed at the laminate 12.

The first ply 22 and/or the second ply 28 may be transparent or translucent to visible radiation. By "transparent" is meant having visible radiation transmittance of greater than 0% up to 100%. Alternatively, the ply may be translucent. By "translucent" is meant diffusing visible radiation such that objects on the side opposite a viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the plies 22, 28 may include conventional soda-lime-silicate glass, borosilicate glass, or leaded glass. The glass may be clear glass. By "clear glass" is meant non-tinted or non-colored glass. Alternatively, the glass may be tinted or otherwise colored glass. The glass may be annealed or heat-treated glass. As used herein, the term "heat treated" means tempered or at least partially tempered. The glass may be of any type, such as conventional float glass, and may be of any composition having any optical properties, e.g., any value of visible radiation transmittance, ultraviolet radiation transmittance, infrared radiation transmittance, and/or total solar energy transmittance. By "float glass" is meant glass formed by a conventional float process in which molten glass is deposited onto a molten metal bath and controllably cooled to form a float glass ribbon.

The first ply and/or the second ply 22, 28 may be, for example, clear float glass or may be tinted or colored glass. The plies 22, 28 may be of any desired dimensions, e.g., length, width, shape, or thickness. Non-limiting examples of glass that may be used for the practice of the invention include clear glass, Starphire®, Solargreen®, Solextra®, GL-20®, GL-35™, Solarbronze®, Solargray® glass, Pacifica® glass, SolarBlue® glass, and Optiblue® glass, all commercially available from Vitro Architectural Glass of Pittsburgh, Pennsylvania.

The other of the first ply 22 and the second ply 28 may be of any of the materials described above for the first ply 22 and/or the second ply 28. The first ply 22 and the second ply 28 may be the same or different from one another. The first and second plies 22, 28 may each be, for example, clear float glass or may be tinted or colored glass or one ply 22, 28 may be clear glass and the other ply 22, 28 colored glass.

Figure 2A:
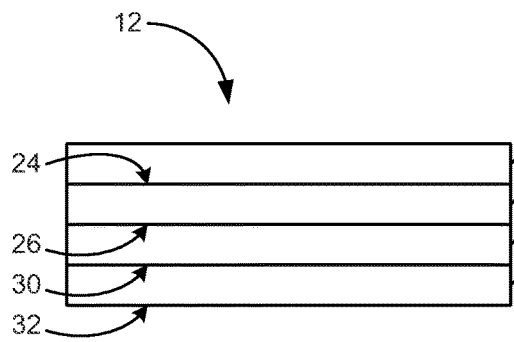
FIGS. 2A-2F are side views (not to scale) of various examples of a laminate having an enhanced p-polarized reflective coating.
Figure 2B:
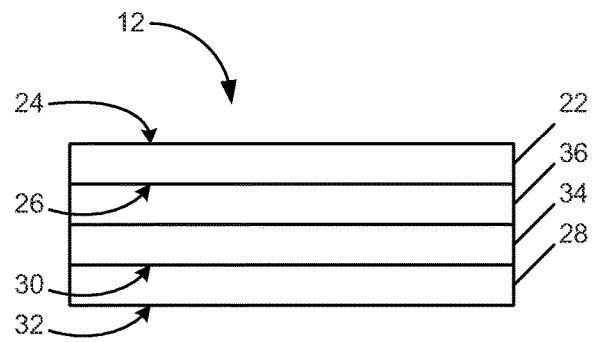
Figure 2C:
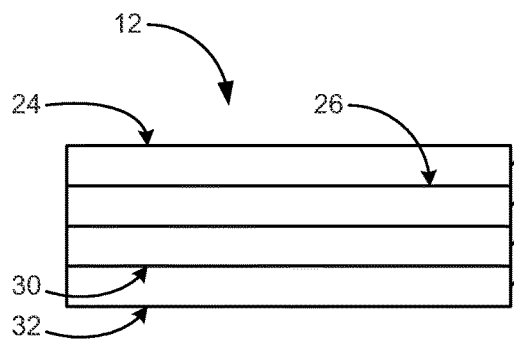
Figure 2D:
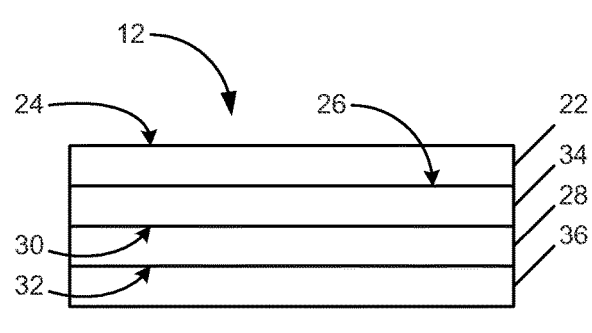

With continued reference to FIGS. 2A-2F, the laminate 12 may also include an enhanced p-polarized reflective coating 36 positioned over at least a portion of one of the surfaces 24, 26, 30, 32 of the plies 22, 28. In FIG. 2A, the enhanced p-polarized reflective coating 36 is positioned over the first surface 24. In FIG. 2B, the enhanced p-polarized reflective coating 36 is positioned over the second surface 26. In FIG. 2C, the enhanced p-polarized reflective coating 36 is positioned over the third surface 30. In FIG. 2D, the enhanced p-polarized reflective coating 36 is positioned over the fourth surface 32.

Figure 2E:
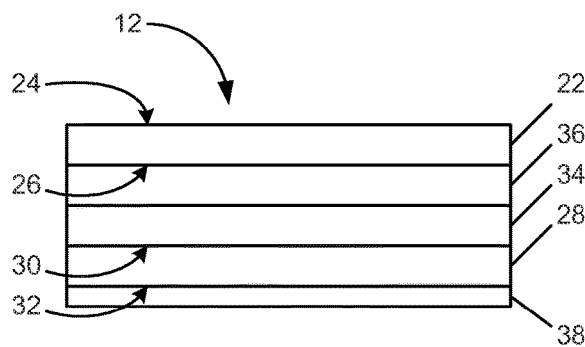
Figure 2F:
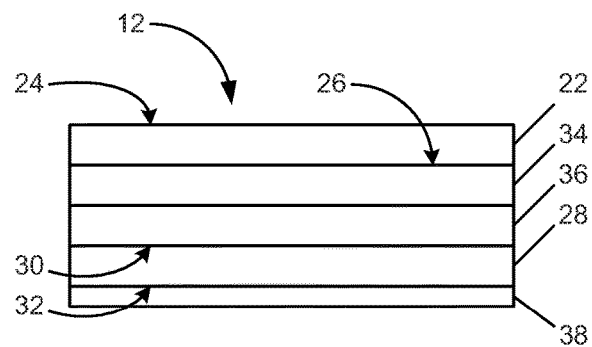

With continued reference to FIGS. 2E-2F, the laminate 12 may include further coating layers beyond the enhanced p-polarized reflective coating 36. The laminate 12 may include an anti-reflective coating 38 positioned over one of the surfaces 24, 26, 30, 32 of the plies 22, 28. As shown in FIGS. 2E and 2F, the anti-reflective coating 38 may be positioned over the fourth surface 32 when the enhanced p-polarized reflective coating 36 is positioned over the second surface 26 (FIG. 2E) or the third surface 30 (FIG. 2F).

Enhanced P-Polarized Reflective Coating

Figure 3A:
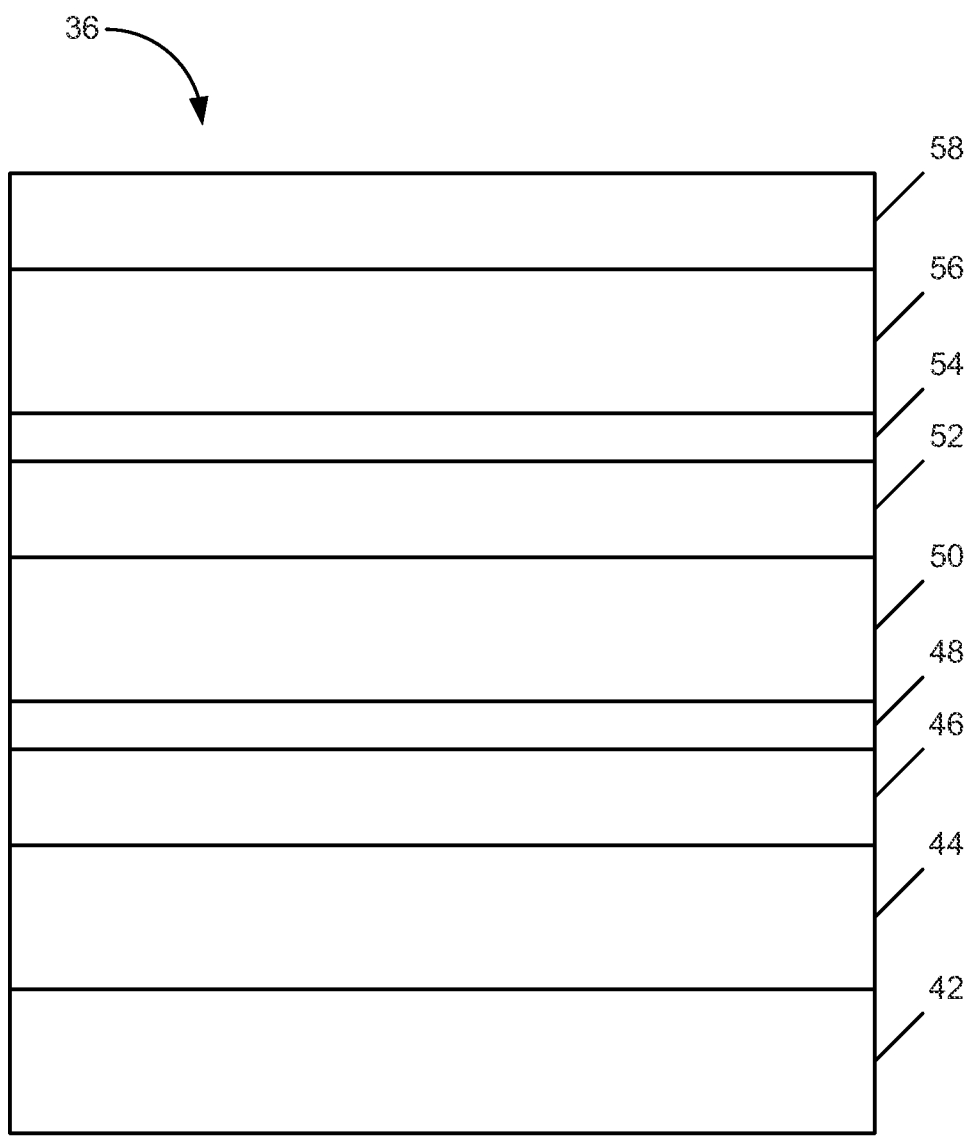
FIGS. 3A and 3B are side views (not to scale) of enhanced p-polarized reflective coatings located over a substrate, the enhanced p-polarized reflective coatings including two metal functional layers.
Figure 3B:
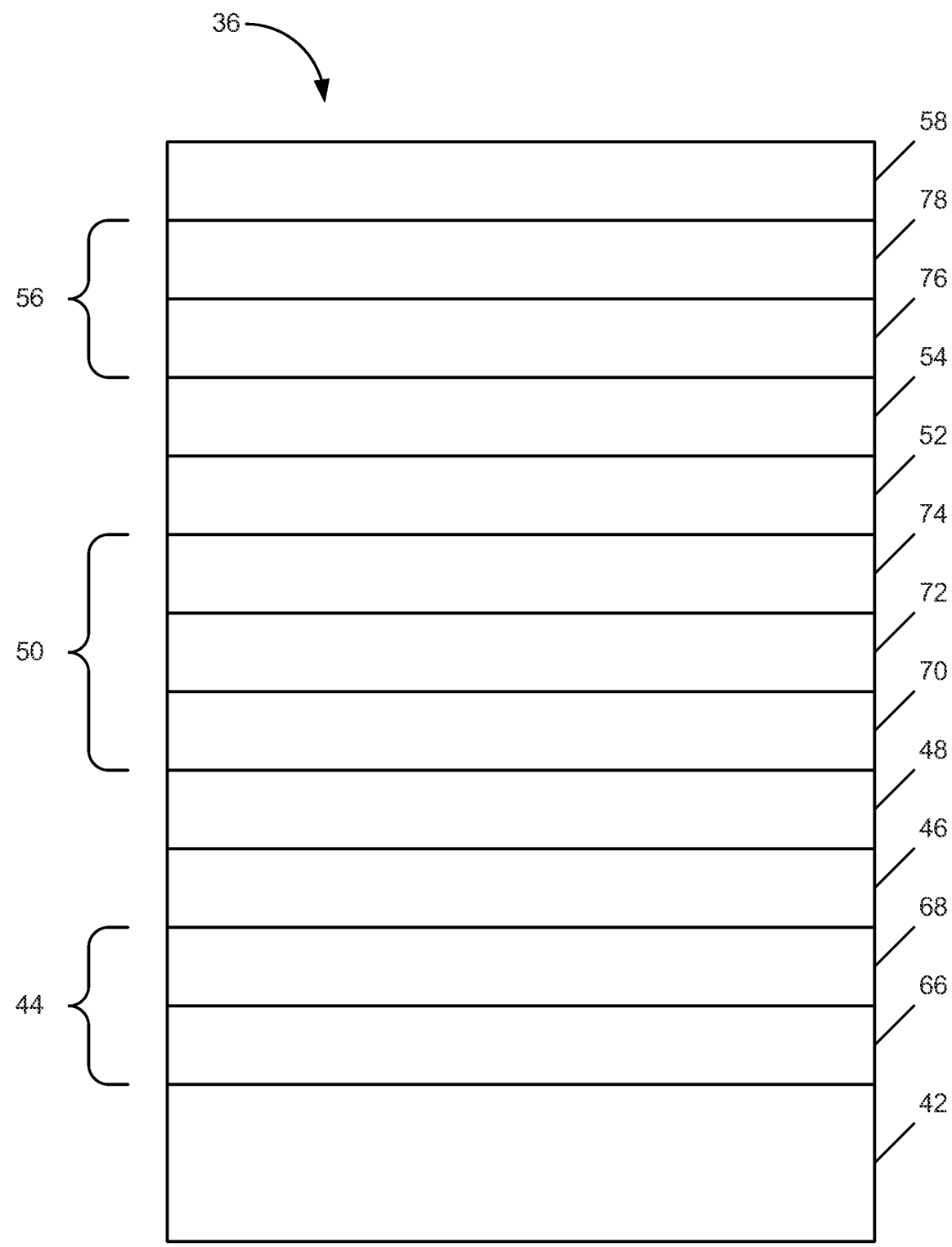

Referring to FIGS. 3A and 3B, the enhanced p-polarized reflective coating 36 may be a double metal functional layer enhanced p-polarized reflective coating 36. In the double metal functional layer enhanced p-polarized reflective coating 36, a base layer 44 may be positioned over a substrate 42 (the substrate 42 being one of the previously-described surfaces 24, 26, 30, 32). A first metal functional layer 46 may be positioned over the base layer 44. A first sacrificial metal layer 48 may be positioned over the first metal functional layer 46. A first phase adjustment layer 50 may be positioned over the first sacrificial metal layer 48. A second metal functional layer 52 may be may be positioned over the first phase adjustment layer 50. A second sacrificial metal layer 54 may be positioned over the second metal functional layer 52. A topcoat layer 56 may be positioned over the second sacrificial metal layer 54. An overcoat 58 may be positioned over the topcoat layer 56.

Referring to FIG. 3B, at least one of the layers in the enhanced p-polarized reflective coating 36 of the double metal functional layer enhanced p-polarized reflective coating 36 may include multiple layers. The base layer 44 may include a first film 66 and a second film 68. The first film 66 may be positioned over the substrate 42, and the second film 68 may be positioned over the first film 66. The first phase adjustment layer 50 may include a first film 70, a second film 72, and a third film 74. The first film 70 may be positioned over the first sacrificial metal layer 48. The second film 72 may be positioned over the first film 70, and the third film 74 may be positioned over the second film 72. The topcoat layer 56 may include a first film 76 and a second film 78. The first film 76 may be positioned over the second sacrificial metal layer 54, and the second film 78 may be positioned over the first film 76.

Figure 4A:
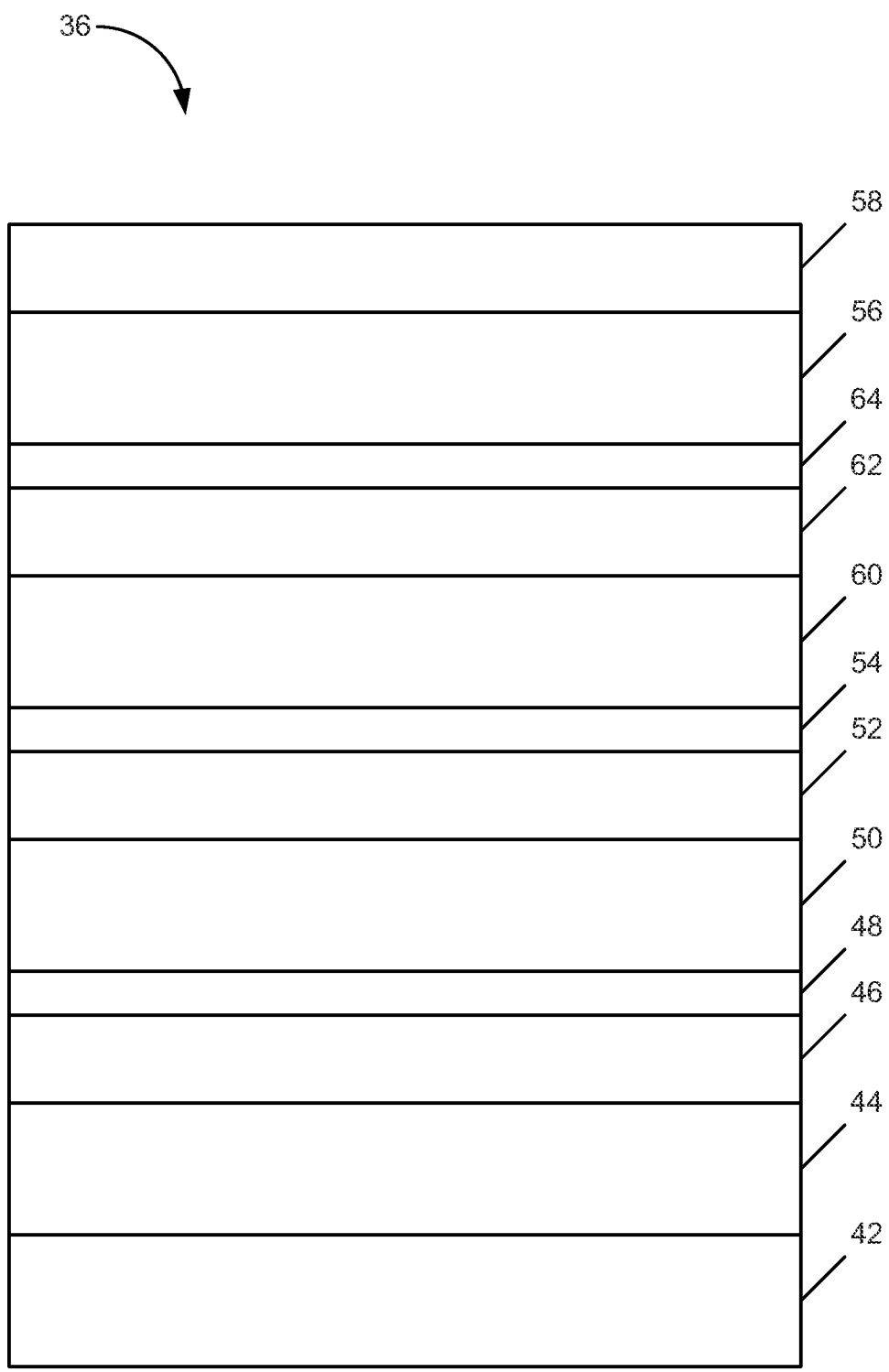
FIGS. 4A and 4B are side views (not to scale) of enhanced p-polarized reflective coatings located over a substrate, the enhanced p-polarized reflective coatings including three metal functional layers.
Figure 4B:
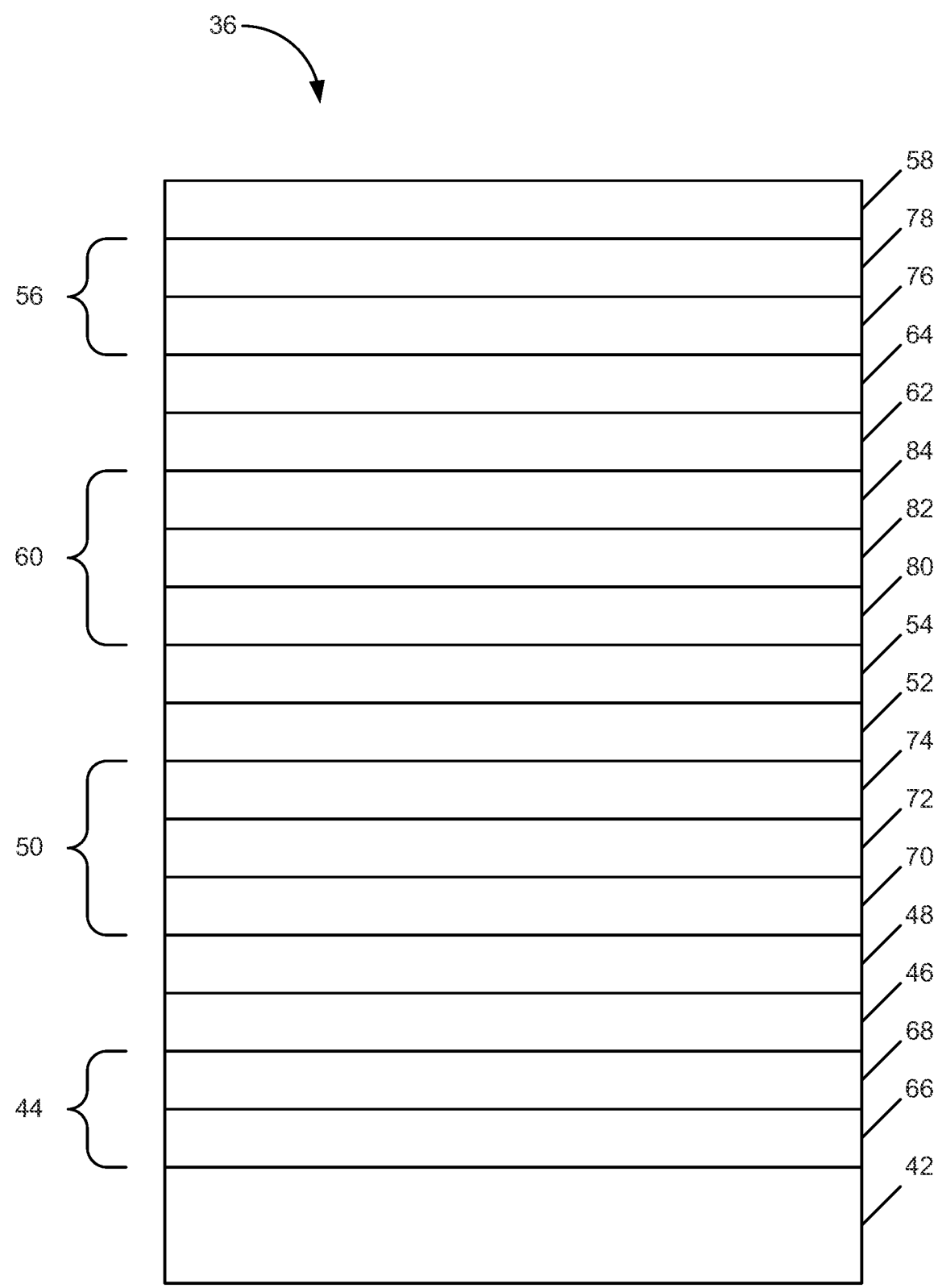

Referring to FIGS. 4A and 4B, the enhanced p-polarized reflective coating 36 may be a triple metal functional enhanced reflective coating 36, which includes several additional layers compared to the double metal functional layer enhanced p-polarized reflective coating 36 of FIGS. 3A and 3B. The triple metal functional enhanced p-polarized reflective coating 36 may further include (compared to the double metal functional layer enhanced p-polarized reflective coating 36) a second phase adjustment layer 60 positioned over the second sacrificial metal layer 54. A third metal functional layer 62 may be positioned over the second phase adjustment layer 60. A third sacrificial metal layer 64 may be positioned over the third metal functional layer 62. The topcoat layer 56 and the overcoat layer 58 (previously described) may be positioned over the third sacrificial metal layer 64.

Referring to FIG. 4B, at least one of the layers in the enhanced p-polarized reflective coating 36 of the triple metal functional layer enhanced p-polarized reflective coating 36 may include multiple layers. In addition to those described in the double metal functional layer enhanced p-polarized reflective coating 36 (FIG. 3B), the second phase adjustment layer 60 of the triple metal functional layer enhanced p-polarized reflective coating 36 may have multiple layers. The second phase adjustment layer 60 may include a first film 80, a second film 82, and a third film 84. The first film 80 may be positioned over the second sacrificial metal layer 54. The second film 82 may be positioned over the first film 80, and the third film 84 may be positioned over the second film 82. In the multi-layer topcoat layer 56 previously described, the first film 76 may be positioned over the third sacrificial metal layer 64.

Based on this disclosure, it will be appreciated that further repeating coating units are within the scope of the invention. For example, adding additional phase adjustment layers, metal functional layers, and/or sacrificial metal layers (e.g., to form quadruple, quintuple, and the like, metal functional layer enhanced p-polarized reflective coatings 36) is also contemplated by this disclosure.

The enhanced p-polarized reflective coating 36 may be an electroconductive low emissivity coating that allows visible wavelength energy to be transmitted through the coating but reflects longer wavelength solar infrared energy. By "low emissivity" is meant emissivity less than 0.4, such as less than 0.3, such as less than 0.2, such as less than 0.1, e.g., less than or equal to 0.05.

The enhanced p-polarized reflective coating 36, when applied to the substrate 42, may make the substrate 42 neutral in color such that the reflectivity for color value a* and/or b* is between −2 and 2, in accordance with 1976 CIELAB color system specified by the International Commission on Illumination. The substrate 42 may have a low exterior reflectance, such that the reflectance is less than or equal to 30%, such as less than or equal to 15%, when observing the substrate 42 from an angle normal to the substrate 42.

The enhanced p-polarized reflective coating 36 may be deposited on the substrate 42 by any conventional method. Examples of such methods include conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the enhanced p-polarized reflective coating 36 may be deposited by MSVD.

The enhanced p-polarized reflective coating 36 may be deposited over a portion of or the entire surface of the substrate 42. In some examples, the enhanced p-polarized reflective coating 36 may be deposited over a first larger region of the substrate 42 and then a portion of the first larger region may be "deleted" so that the enhanced p-polarized reflective coating 36 is positioned over a second smaller region, which is a sub-region of the first larger region.

1. Base Layer

The base layer 44 may include a nonmetallic layer(s). For example, the base 44 layer may include dielectric or semiconductor materials. For example, the base layer 44 may include oxides, nitrides, oxynitrides, and/or mixtures thereof. Examples of suitable materials for the base layer 44 may include oxides, nitrides, or oxynitrides of titanium, hafnium, zirconium, niobium, zinc, bismuth, lead, indium, tin, and mixtures thereof. These may have small amounts of other materials, such as manganese in bismuth oxide, tin in indium oxide, etc. Additionally, oxides of metal alloys or metal mixtures may be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, may be used. Particular examples of materials include zinc oxides, tin oxides, silicon nitrides, silicon-aluminum nitrides, silicon-nickel nitrides, silicon-chromium nitrides, antimony doped tin oxide, aluminum doped zinc oxide, indium doped zinc oxide, titanium oxide, and/or mixtures thereof. The base layer 44 may include a single material. Alternatively, the base layer 44 may include multiple materials and/or multiple layers.

The base layer 44 may allow adjustment of the constructive and destructive optical interference of electromagnetic radiation partially reflected from, and/or partially transmitted by, the various interface boundaries of the layers of the enhanced p-polarized reflective coating 36. Additionally, the base layer 44 may provide chemical and/or mechanical protection for other layers of the enhanced p-polarized reflective coating 36, such as the metal functional layers 46, 52, 62.

Where high visible light transmittance is desired, the base layer 44 may act as an antireflective layer to anti-reflect the metal functional layers 46, 52, 62 to reduce the overall visible light reflectance and/or increase the visible light transmittance of the enhanced p-polarized reflective coating 36. Materials having refractive indices around 2 are particularly useful for anti-reflection of the metal functional layers 46, 52, 62.

In the illustrated exemplary enhanced p-polarized reflective coating 36, the base layer 44 may be positioned over at least a portion of the substrate 42 (which may be one of the surfaces 24, 26, 30, 32 of one of the plies 22, 28). The base layer 44 may be a single layer or may include one or more films of anti-reflective materials and/or dielectric materials described above. The base layer 44 may be transparent to visible light.

As discussed above, the base layer 44 may include a metal oxide, a mixture of metal oxides, and/or a metal alloy oxide. For example, the base layer 44 may include oxides of zinc and tin.

The base layer 44 may have a thickness in the range of 300-550 angstroms. For example, the base layer 44 may have a thickness in the range of 300-500 angstroms; 350-430 angstroms or 375-430 angstroms. For example, the base layer 44 may have a thickness in the range of 350-550 angstroms, 400-500 angstroms; or 420-490 angstroms.

The base layer 44 may include a multi-film structure having a first film 66 and/or a second film 68. The first film 66 may be, e.g., a metal alloy oxide film. The second film 68 may be, e.g., a metal oxide film or an oxide mixture film. The second film 68 may be positioned over the first film 66.

The first film 66 may be a zinc/tin alloy oxide. By "zinc/tin alloy oxide" is meant both true alloys and also mixtures of the oxides. The zinc/tin alloy oxide may be that obtained from magnetron sputtering vacuum deposition from a cathode of zinc and tin. The cathode may include zinc and tin in proportions of 5 wt. % to 95 wt. % zinc and 95 wt. % to 5 wt. % tin, such as 10 wt. % to 90 wt. % zinc and 90 wt. % to 10 wt. % tin. However, other ratios of zinc to tin could also be used. An exemplary metal alloy oxide for the first film 42 may be written as $Zn_xSn_{1-x}O_{2-x}$ (Formula 1) where "x" varies in the range of greater than 0 to less than 1. For instance, "x" may be greater than 0 and may be any fraction or decimal between greater than 0 to less than 1. The stoichiometric form of Formula 1 is "$Zn_2SnO_4$", commonly referred to as zinc stannate. A zinc stannate layer may be sputter deposited from a cathode having 52 wt. % zinc and 48 wt. % tin in the presence of oxygen. For example, the first film 66 may include zinc stannate.

The second film 68 may include a metal oxide film. For example, the second film 68 may include zinc oxide. The zinc oxide may be deposited from a zinc cathode that includes other materials to improve the sputtering characteristics of the cathode. For example, the zinc cathode may include a small amount of tin (e.g., up to 10 wt. %, such as up to 5 wt. %) to improve sputtering. Thus, the resultant zinc oxide film may include a small percentage of tin oxide, e.g., up to 10 wt. % tin oxide, e.g., up to 5 wt. % tin oxide. A coating layer deposited from a zinc cathode having up to 10 wt. % tin is referred to herein as "a zinc oxide film" even though a small amount of tin oxide (e.g., up to 10 wt. %) may be present. The tin in the cathode is believed to form tin oxide in the predominantly zinc oxide second film 68.

2. Metal Functional Layers

At least one of the metal functional layers 46, 52, 62 may be a continuous metal layer. By "continuous" metal layer is meant an unbroken or non-disconnected layer, such as a homogeneous layer.

The metal functional layers 46, 52, 62 provide reflectance of electromagnetic radiation in at least a portion of the infrared radiation region of the electromagnetic spectrum, for example, in the solar infrared radiation region and/or the thermal infrared radiation region of the electromagnetic spectrum.

Examples of materials useful for the metal functional layers 46, 52, 62 include noble or near noble metals. Examples of such metals include silver, gold, platinum, palladium, osmium, iridium, rhodium, ruthenium, copper, mercury, rhenium, aluminum, and combinations thereof. For example, one or more of the metal functional layers 46, 52, 62 may include metallic silver.

The first metal functional layer 46 may be positioned over the base layer 44 and may include any of the above metals. For example, the first metal functional layer 46 may include silver. The first metal functional layer 46 may be a continuous layer.

The first metal functional layer 46 may be a continuous layer having a thickness in the range of 10-200 angstroms. For example, the first metal functional layer 46 may have a thickness in the range of 10-200 angstroms or 50-150 angstroms. For example, the first metal functional layer 46 may have a thickness in the range of 10-150 angstroms or 50-125 angstroms.

The second metal functional layer 52 may be positioned over the first phase adjustment layer 50. The second metal functional layer 52 may be a continuous layer including silver.

The second metal functional layer 52 may be a continuous layer having a thickness in the range of 10-150 angstroms. For example, the second metal functional layer 52 may have a thickness in the range of 10-150 angstroms or 50-125 angstroms. For example, the second metal functional layer 52 may have a thickness in the range of 10-100 angstroms; 50-75 angstroms or 65-75 angstroms.

The third metal functional layer 62 may include any of the materials discussed above with respect to the first or second metal functional layers 46, 52. For example, the third metal functional layer 62 may include silver. The third metal functional layer 62 may be a continuous layer positioned over the second phase adjustment layer 60.

For example, the third metal functional layer 62 may be a continuous layer having a thickness in the range of 50-200 angstroms; 75-150 angstroms or 60-140.

The this metal functional layer 46, the second metal functional layer 52 and the optional third metal functional layer 62 have a combined thickness. The combined thickness may be in the range of 100-350 angstroms; or 150-300 angstroms or 175-275 angstroms. In embodiments that only comprise the first and second metal functional layers 46 and 52, the combined thickness may be in the range of 150-250 angstroms, 175-225 angstroms; 175-215 angstroms; or 178-211 angstroms. For embodiments that comprise the first, second and third metal functional layers 46, 52, and 62, the combine thickness may be in the range of 225-325 angstroms, 240-300 angstroms, 250-280 angstroms, or 253-275 angstroms.

3. Sacrificial Metal Layers

The sacrificial metal layers 48, 54, 64 may be positioned in direct contact with the associated underlying metal functional layer 46, 52, 62. The sacrificial metal layers 48, 54, 64 may protect the associated metal functional layers 46, 52, 62 during the coating process and/or subsequent processing, such as thermal tempering. The sacrificial metal layer 48, 54, 64 may be deposited as a metal. During subsequent processing, such as the deposition of the overlying phase adjustment layer 50, 60 or topcoat layer 56 and/or thermal tempering, some or all of the sacrificial metal layer 48, 54, 64 may oxidize. When oxide or nitride materials are used in the overlying phase adjustment layer 50, 60 or topcoat layer 56, the sacrificial metal layer 48, 54, 64 may include oxophillic or nitrophillic materials, respectively. The sacrificial metal layers 48, 54, 64 need not be all the same material. The sacrificial metal layers 48, 54, 64 need not be of the same thickness.

Examples of materials useful for the sacrificial metal layers 48, 54, 64 include titanium, niobium, tungsten, nickel, chromium, iron, tantalum, zirconium, aluminum, silicon, indium, tin, zinc, molybdenum, hafnium, bismuth, vanadium, manganese, and combinations thereof.

The first sacrificial metal layer 48 may be positioned over the first metal functional layer 46. The first sacrificial metal layer 48 may be a single film or a multiple film layer. The first sacrificial metal layer 48 may include any of the materials described above. For example, the first sacrificial metal layer 48 may include titanium.

The second sacrificial metal layer 54 may be positioned over the second metal functional layer 52. The second sacrificial metal layer 54 may be of any of the materials as described above with respect to the first sacrificial metal layer 48. For example, the second sacrificial metal layer 54 may include titanium.

The third sacrificial metal layer 64 may be positioned over the third metal functional layer 62. The third sacrificial metal layer 64 may be of any of the materials as described above with respect to the first or second sacrificial metal layer 48, 54. For example, the third sacrificial metal layer 64 may include titanium.

The sacrificial metal layers 48, 54, 64 may have the same or a different thickness in the range of 10-50 angstroms, such as 20-40 angstroms or 25-35 angstroms. The thickness of the sacrificial metal layers may be chosen to provide sufficient protection to the underlying functional metal layer (e.g., such that the sacrificial metals preferably oxidize to protect the underlying metal functional layer during deposition of overlaying layers).

4. Phase Adjustment Layers

The phase adjustment layers 50, 60 may be nonmetallic layers. For example, the phase adjustment layers 50, 60 may include dielectric or semiconductor materials. For example, the phase adjustment layers 50, 60 may include oxides, nitrides, oxynitrides, and/or mixtures thereof. Examples of suitable materials for the phase adjustment layers 50, 60 may include oxides, nitrides, or oxynitrides of titanium, hafnium, zirconium, niobium, zinc, bismuth, lead, indium, tin, and mixtures thereof. These may have small amounts of other materials, such as manganese in bismuth oxide, tin in indium oxide, etc. Additionally, oxides of metal alloys or metal mixtures may be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, may be used. Particular examples of materials include zinc oxides, tin oxides, silicon nitrides, silicon-aluminum nitrides, silicon-nickel nitrides, silicon-chromium nitrides, antimony doped tin oxide, aluminum doped zinc oxide, indium doped zinc oxide, titanium oxide, and/or mixtures thereof.

The phase adjustment layers 50, 60 may include a single material. Alternatively, the phase adjustment layers 50, 60 may include multiple materials and/or multiple layers. The different phase adjustment layers 50, 60 may include the same or different materials. The phase adjustment layers 50, 60 may have the same or different thicknesses.

The phase adjustment layers 50, 60 may allow adjustment of the constructive and destructive optical interference of electromagnetic radiation partially reflected from, and/or partially transmitted by, the various interface boundaries of the layers of the enhanced p-polarized reflective coating 36. Varying the thicknesses and/or compositions of the phase adjustment layers 50, 60 may change the overall reflectance, transmittance, and/or absorptance of the enhanced p-polarized reflective coating 36, which may alter the solar control performance, thermal infrared insulating performance, color, and/or aesthetics of the enhanced p-polarized reflective coating 36. Additionally, the phase adjustment layers 50, 60 may provide chemical and/or mechanical protection for other layers of the enhanced p-polarized reflective coating 36, such as the metal functional layers 46, 52, 62.

Where high visible light transmittance is desired, the phase adjustment layers 50, 60 may act as anti-reflective layers to anti-reflect the metal functional layers 46, 52, 62 to reduce the overall visible light reflectance and/or increase the visible light transmittance of the enhanced p-polarized reflective coating 36. Materials having refractive indices around 2 are particularly useful for anti-reflection of the metal functional layers 46, 52, 62.

The first phase adjustment layer 50 may be positioned over the first sacrificial metal layer 48. The first phase adjustment layer 50 may include one or more of the materials and/or films described above.

The first phase adjustment layer 50 may have a thickness in the range of 600-1,100 angstroms. For example, the first phase adjustment layer 50 may have a thickness in the range of 700-1,100 angstroms, such as 850-1,050 angstroms, such as 675-1050 angstroms or such as 689-1048 angstroms. For example, the first phase adjustment layer 50 may have a thickness in the range of 600-1,000 angstroms, such as 675-875 angstroms, or such as 689-866 angstroms. For example, the first phase adjustment layer 50 may have a thickness in the range of 825-1100 angstroms, such as 850-1075 angstroms, such as 875-1050 angstroms, such as 879-1048 angstroms.

The first phase adjustment layer 50 may be a single layer or a multilayer structure. For example, the first phase adjustment layer 50 may include a first film 70, a second film 72, and a third film 74.

For example, the first film 70 may include a metal oxide film. For example, the first film 70 may include a zinc oxide film.

For example, the second film 72 may include a metal alloy oxide film. For example, the second film 72 may include a zinc stannate film.

For example, the third film 74 may include a metal oxide film. For example, the third film 56 may include a zinc oxide film.

An optional second phase adjustment layer 60 may be positioned over the second sacrificial metal layer 54. The second phase adjustment layer 60 may include any of the materials and/or layers as discussed above with respect to the first phase adjustment layers 50. For example, the second phase adjustment layer 60 may be a multi-film structure. For example, the second phase adjustment layer 60 may include a first film 80, a second film 82, and a third film 84.

The second phase adjustment layer 60 may have a thickness in the range of 500-1,000 angstroms, such as 600-825 angstroms or such as 619-817 angstroms.

The first film 80 may include a metal oxide layer, for example, a zinc oxide layer. The second film 82 may include a metal alloy oxide material, for example, zinc stannate. The third film 84 may include a metal oxide layer, for example, a zinc oxide layer.

5. Topcoat Layer

The topcoat layer 56 may include one or more materials and/or layers as discussed above with respect to the first or second phase adjustment layers 50, 60.

The topcoat layer 56 may have a thickness in the range of 300-450 angstroms. The topcoat layer 56 may have a thickness in the range of 300-400 angstroms or 340-375 angstroms. The topcoat layer 56 may have a thickness in the range of 275-450 angstroms or 300-415 angstroms or 311-411 angstroms or 346-368 angstroms.

The topcoat layer 56 may include a first film 76 and a second film 78. The first film 76 may include a metal oxide layer, for example, a zinc oxide layer. The second film 78 may include a metal-alloy oxide layer, for example, a zinc stannate layer.

6. Overcoat

The enhanced p-polarized reflective coating 36 may include an overcoat 58 positioned over the topcoat layer 56. The overcoat 58 may be deposited over the topcoat layer 56 to assist in protecting the underlying layers from mechanical and chemical attack during processing. The overcoat 58 may be an oxygen barrier coating layer to prevent or reduce the passage of ambient oxygen into the underlying layers of the enhanced p-polarized reflective 36, such as during heating or bending. The overcoat 58 may be of any desired material or mixture of materials. In one exemplary embodiment, the overcoat 58 may include a layer having one or more metal oxide materials, such as but not limited to oxides of aluminum, silicon, or mixtures thereof (e.g., be a silica and alumina coating). For example, the overcoat 58 may be a single coating layer including in the range of 0 wt. % to 100 wt. % alumina and/or 100 wt. % to 0 wt. % silica, such as 5 wt. % to 95 wt. % alumina and 95 wt. % to 5 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt. % to 90 wt. % alumina and 30 wt. % to 10 wt. % silica, e.g., 75 wt. % to 85 wt. % alumina and 25 wt. % to 15 wt. % of silica, e.g., 88 wt. % alumina and 12 wt. % silica, e.g., 65 wt. % to 75 wt. % alumina and 35 wt. % to 25 wt. % silica, e.g., 70 wt. % alumina and 30 wt. % silica, e.g., 60 wt. % to less than 75 wt. % alumina and greater than 25 wt. % to 40 wt. % silica. The overcoat 58 may be a single coating layer including 85 wt. % silica and 15 wt. % alumina. Other materials, such as aluminum, chromium, hafnium, yttrium, nickel, boron, phosphorous, titanium, zirconium, and/or oxides thereof, may also be present, such as to adjust the refractive index of the overcoat 58. In one non-limiting example, the refractive index of the overcoat 58 may be in the range of 1 to 3, such as 1 to 2, or such as 1.4 to 2, such as 1.4 to 1.8.

The overcoat 58 may be a combination silica and alumina coating. The overcoat 58 may be sputtered from two cathodes (e.g., one silicon and one aluminum) or from a single cathode containing both silicon and aluminum. This silicon/ aluminum oxide overcoat 58 may be written as $Si_xAl_{1-x}O_{1.5+x/2}$, where "x" may vary from greater than 0 to less than 1.

Alternatively, the overcoat 58 may be a multi-layer coating formed by separately formed layers of metal oxide materials, such as, but not limited to, a bilayer formed by one metal oxide-containing layer (e.g., a silica and/or alumina-containing first layer) formed over another metal oxide-containing layer (e.g., a silica and/or alumina-containing second layer). The individual layers of the multi-layer protective coating may be of any desired thickness.

The overcoat 58 may be of any desired thickness. In one non-limiting embodiment, the overcoat 58 may be a silicon/aluminum oxide coating ($Si_xAl_{1-x}O_{1.5+x/2}$) having a thickness in the range of 100-1,000 angstroms, such as 600-800 angstroms, or such as 700 angstroms.

Interlayer

Figure 5A:
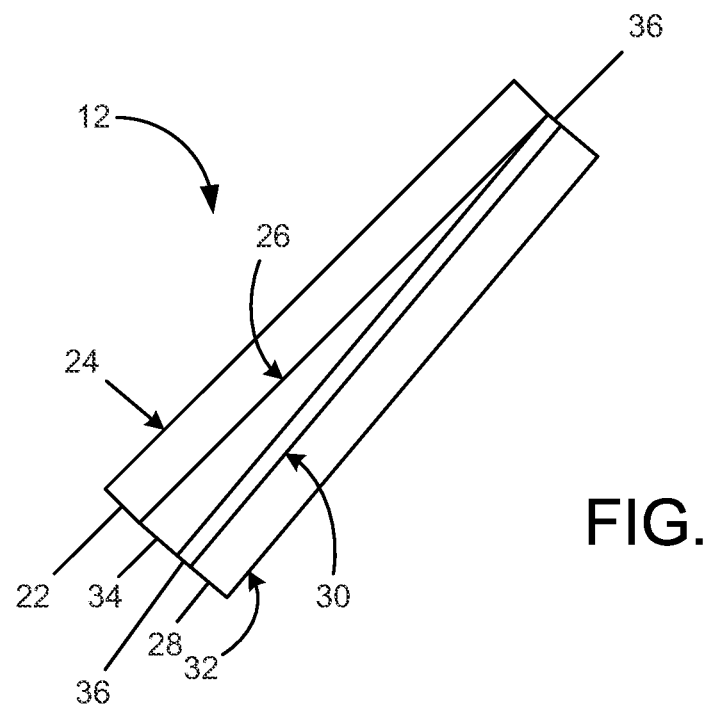
FIG. 5A is a side view (not to scale) of a laminate including two plies and having a wedge-shaped interlayer.
Figure 5B:
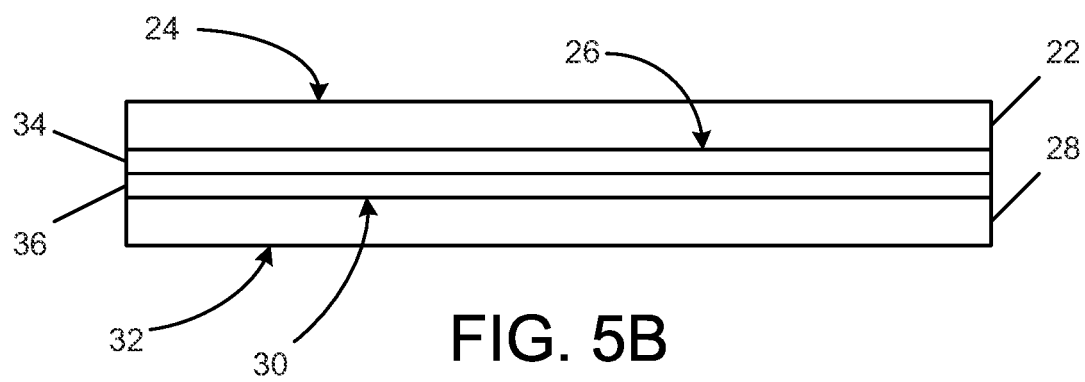
FIG. 5B is a side view (not to scale) of a laminate including two plies having an interlayer of continuous thickness.

Referring to FIGS. 5A and 5B, the laminate 12 may include the interlayer 34. The interlayer 34 may be of a suitable material so as to hold the plies 22, 28 together. The interlayer 34 may be made of a polymer, such as polyvinyl butyral (PVB). The interlayer 34 may be positioned over the second surface 26 and/or the third surface 30. The interlayer 34 may be in contact with the enhanced p-polarized reflective coating 36. The interlayer 34 may be of any suitable thickness to hold the plies 22, 28 together. The interlayer 34 may be a 0.76 mm thick interlayer 34 of PVB.

Referring to FIG. 5A, the first ply 22 may be non-parallel relative to the second ply 28. The interlayer 34 may be positioned between the first ply 22 and the second ply 28 and may be wedge-shaped. The wedge-shape of the interlayer 34 may be configured such that the radiation 16 reflects off of the laminate 12 at the proper angle to avoid ghosting (e.g., to avoid seeing multiple images based on the direction of the light reflecting off of the laminate 12 converging at different points).

Referring to FIG. 5B, the interlayer 34 may be a layer of uniform thickness in other arrangements of the laminate 12, as the interlayer 34 may not need to be wedge-shaped to avoid the ghosting issue because other aspects of the design of the laminate 12 counteract ghosting.

Additional Coating Layers

As previously discussed, the laminate 12 may include additional layers beyond the enhanced p-polarized reflective coating 36. The laminate 12 may include the anti-reflective coating 38. The anti-reflective coating 38 may be positioned over the first surface 24 and/or the fourth surface 32. The anti-reflective coating can comprise alternating layers of relatively high and low index of refraction materials. A "high" index of refraction material is any material having a higher index of refraction than that of the "low" index material. The low index of refraction material can be a material having an index of refraction of less than or equal to 1.75. Non-limiting examples of such materials include silica, alumina, and mixtures or combinations thereof. The high index of refraction material is a material having an index of refraction of greater than 1.75. Non-limiting examples of such materials include zirconia and zinc stannate. The anti-reflective coating can be, for example, a multi-layer coating having a first metal alloy oxide layer (first layer), a second metal oxide layer (second layer), a third metal alloy oxide layer (third layer), and a metal oxide top layer (fourth layer). In one non-limiting example, the fourth layer (upper low index layer) comprises silica or alumina or a mixture or combination thereof, the third layer (upper high index layer) comprises zinc stannate or zirconia or mixtures or combinations thereof, the second layer (bottom low index layer) comprises silica or alumina or a mixture or combination thereof, and the first layer (bottom high index layer) comprises zinc stannate or zirconia or mixtures or combinations thereof. Other suitable anti-reflective coatings are disclosed in U.S. Pat. No. 6,265,076 at column 2, line 53 to column 3, line 38; and Examples 1-3. Further suitable anti-reflective coatings are disclosed in U.S. Pat. No. 6,570,709 at column 2, line 64 to column 5, line 22; column 8, lines 12-30; column 10, line 65 to column 11, line 11; column 13, line 7 to column 14, line 46; column 16, lines 35-48; column 19, line 62 to column 21, line 4; Examples 1-13; and Tables 1-8.

The anti-reflective coating 38 may reduce the overall visible light reflectance and/or increase the visible light transmittance of the enhanced p-polarized reflective coating 36. Materials having refractive indices around 2 are particularly useful for the anti-reflective coating 38. It will be appreciated that applying an anti-reflective coating 38 over the first surface 24 or the fourth surface 32 may alter the Brewster's angle from the Brewster's angle of an air to glass interface or glass to air interface to the Brewster's angle of the air to anti-reflective coating material interface or the anti-reflective coating material to air interface. In this way, the amount of p-polarized radiation reflected and refracted may be altered compared to the case of the air to glass interface or the glass to air interface by including the anti-reflective coating 38.

The display system of substrate may only two metal functional layers or only three metal functional layers. In embodiments with only two metal functions layers, the enhanced p-polarized reflective coating can have the following ranges of thicknesses for each layer.

| Layer | Thickness (Å) | Preferred (Å) | More preferred (Å) | Most preferred (Å) |
|---|---|---|---|---|
| Base layer | 300-450 | 350-450 | 375-430 | 383-427 |
| $1^{st}$ Metal | 10-200 | 50-175 | 60-150 | 66-142 |
| $1^{st}$ Phase Adjustment | 700-1100 | 850-1075 | 875-1050 | 879-1048 |
| $2^{nd}$ Metal | 10-200 | 25-175 | 50-150 | 65-124 |
| Topcoat | 300-400 | 325-375 | 340-370 | 346-368 |
| Overcoat | 100-1000 | 500-900 | 600-800 | 650-750 |
| Total thickness | 2000-3500 | 2250-3000 | 2500-2700 | 2536-2691 |
| Total metal thickness | 100-300 | 125-275 | 175-225 | 178-211 |
| Total phase adjustment thickness | 750-1250 | 800-1100 | 875-1050 | 879-1048 |
| Total base and phase adjustment thickness | 1100-1600 | 1200-1500 | 1250-1475 | 1262-1454 |
| Total phase adjustment and topcoat thickness | 1100-1600 | 1200-1500 | 1225-1425 | 1242-1407 |
| Total phase adjustment, base and topcoat thickness | 1250-2000 | 1500-1900 | 1600-1850 | 1625-1813 |

In embodiments with only two metal functions layers, the enhanced p-polarized reflective coating can have the following ranges of thicknesses for each layer.

| Layer | Thickness (Å) | Preferred (Å) | More preferred (Å) | Most preferred (Å) |
|---|---|---|---|---|
| Base layer | 350-550 | 400-500 | 420-490 | 422-487 |
| $1^{st}$ Metal | 10-200 | 50-150 | 50-125 | 65-123 |
| $1^{st}$ Phase Adjustment | 600-1100 | 650-950 | 675-875 | 689-866 |
| $2^{nd}$ Metal | 10-150 | 50-125 | 65-75 | 67-74 |
| $2^{nd}$ Phase Adjustment | 500-1000 | 550-900 | 600-825 | 619-817 |
| $3^{rd}$ Metal | 50-200 | 55-175 | 60-150 | 65-135 |
| Topcoat | 300-400 | 375-450 | 300-425 | 311-411 |

| Layer | Thickness (Å) | Preferred (Å) | More preferred (Å) | Most preferred (Å) |
|---|---|---|---|---|
| Overcoat | 100-1000 | 500-900 | 600-800 | 650-750 |
| Total thickness | 3000-3750 | 3100-3500 | 3200-3400 | 3236-3372 |
| Total metal thickness | 175-375 | 200-350 | 250-275 | 253-275 |
| Total phase adjustment thickness | 1200-1800 | 1300-1700 | 1450-1575 | 1485-1567 |
| Total base and phase adjustment thickness | 1700-2250 | 1725-2175 | 1900-2025 | 1924-2016 |
| Total phase adjustment and topcoat thickness | 1500-2250 | 1600-2100 | 1775-1950 | 1796-1943 |
| Total phase adjustment, base and topcoat thickness | 1800-2800 | 2000-2600 | 2250-2400 | 2283-2397 |

Brewster's Angle

The Brewster's angle is defined as an angle of incidence at which p-polarized radiation is perfectly transmitted through the surface of the laminate 12 contacted by the p-polarized radiation. In other words, the Brewster's angle is the angle of incidence at which all p-polarized radiation is refracted/transmitted such that no p-polarized radiation is reflected.

The Brewster's angle for an air to glass interface (such as when the laminate 12 is glass) is approximately 57°. The Brewster's angle for a glass to air interface (such as when the laminate 12 is glass) is approximately 33°. Thus, when the incidence angle of the radiation 16 hitting the fourth surface 32 of the laminate 12 from the radiation source 14 on an inner side of the laminate 12 having an air to glass interface is 57°, all p-polarized radiation is refracted and none is reflected off of the fourth surface 32 to the eye 20 of the user.

Figure 6:
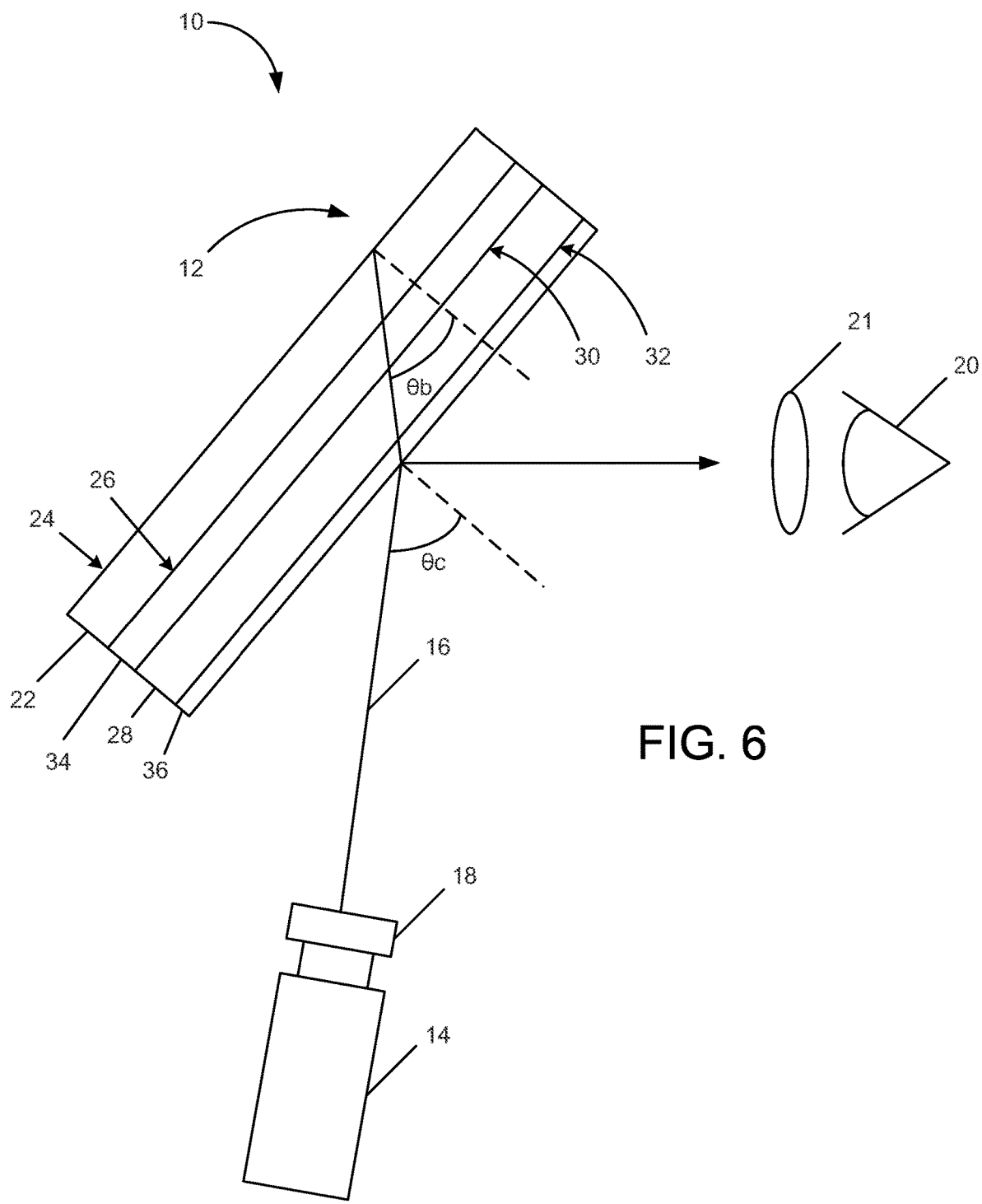
FIG. 6 is a perspective view (not to scale) of a laminate having an enhanced p-polarized reflective coating on a fourth surface and a radiation source positioned such that radiation from the radiation source contacts a first surface of the laminate at a Brewster's angle of a first surface to air interface.

Referring to FIG. 6, the Brewster's angle of the fourth surface 32 of the system 10 may be altered by positioning the enhanced p-polarized reflective coating 36 over the first surface 24 or the fourth surface 32. In FIG. 6, the enhanced p-polarized reflective coating 36 is positioned over the fourth surface 32. In this case, the Brewster's angle at the fourth surface 32 becomes the Brewster's angle for the air to enhanced p-polarized reflective coating 36 interface.

With continued reference to FIG. 6, ghosting may be eliminated by positioning the enhanced p-polarized reflective coating 36 on the first surface 24 or the fourth surface 32 by adjusting the angle at which the radiation 16 hits the enhanced p-polarized reflective coating 36. An example will be explained with the enhanced p-polarized reflective coating 36 positioned over the fourth surface 32, as shown in FIG. 6. The radiation 16 may contact the enhanced p-polarized reflective coating 36 at a coating incidence angle $\theta_c$. This coating incidence angle $\theta_c$ may be selected such that an incidence angle $\theta_b$ at the first surface 24 is the Brewster's angle for the glass to air interface. In other words, the coating incidence angle $\theta_c$ may be selected such that the incidence angle $\theta_b$ is 33°. In this scenario, p-polarized radiation reflects off of the enhanced p-polarized reflective coating 36 at the fourth surface 32 to the eye 20 of the user but does not reflect off of the first surface 24 to the eye 20 of the user because all p-polarized radiation is refracted through at the Brewster's angle. If a polarized filter 18 is used to filter substantially all s-polarized radiation prior to reaching the laminate 12, only p-polarized radiation reflected off of the enhanced p-polarized reflective coating 36 at the fourth surface 32 (as shown in FIG. 6) reaches the eye 20 of the user, and ghosting is therefore reduced or eliminated. It will be appreciated that the enhanced p-polarized reflective coating 36 may be positioned over the first surface 24 and the radiation 16 may be directed at the laminate 12 such that the radiation 16 contacts the fourth surface 32 at the Brewster's angle of that air to glass interface (57°) interface and contacts the first surface 24 at an angle that is not the Brewster's angle of that glass to enhanced p-polarized reflective coating 36 interface.

Test Configuration

Figure 7:
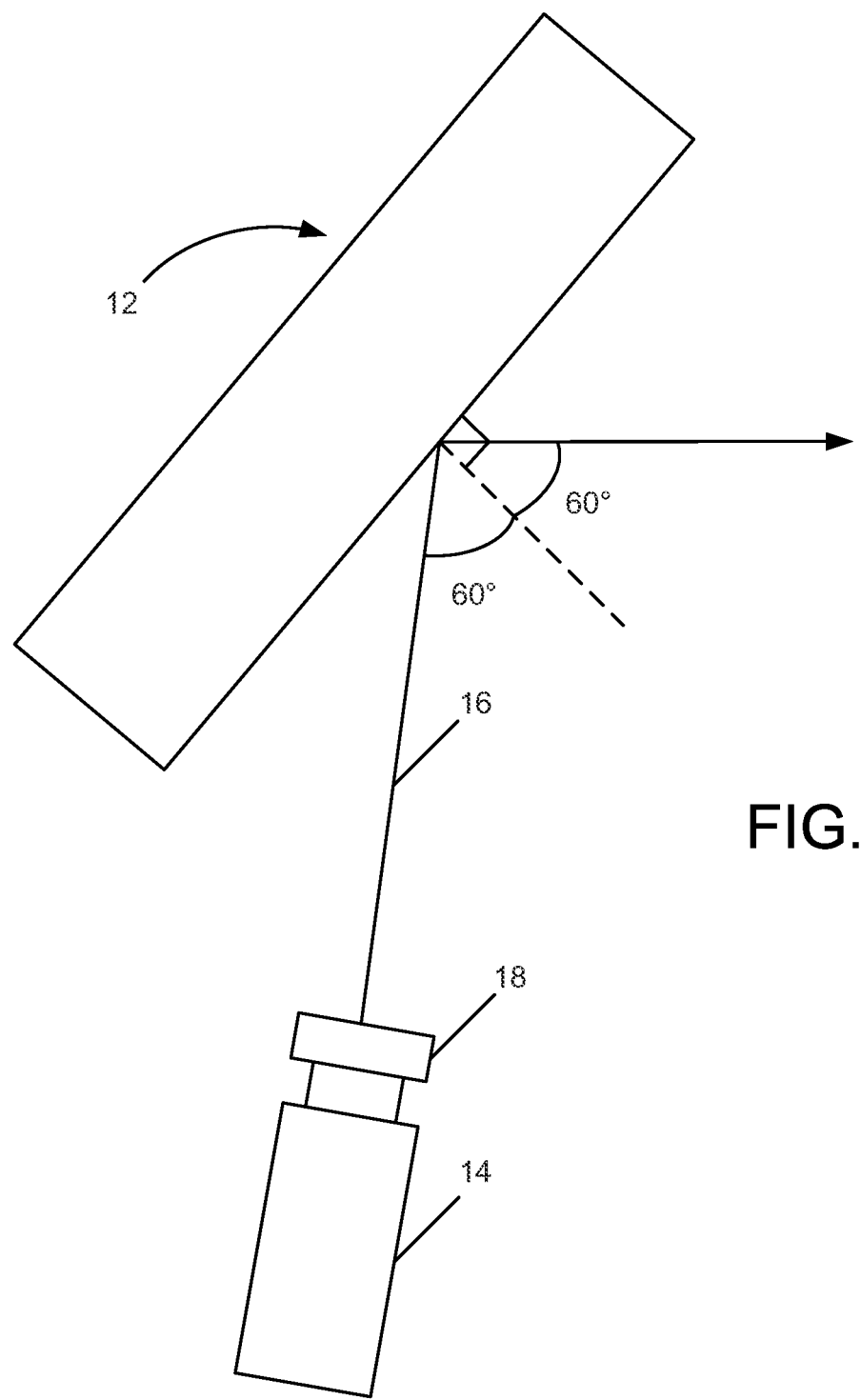
FIG. 7 is a perspective view (not to scale) of a test apparatus for which radiation from a radiation source contacts a laminate at an angle of 60° relative to normal of the laminate.

Referring to FIG. 7, a test apparatus 86 for which the radiation 16 from the radiation source 14 contacts the laminate 12 at an angle of 60° relative to normal of the laminate 12 is shown. In the test apparatus 86, the radiation source 14 is positioned such that the radiation 16 emitted therefrom contacts the laminate 12 at an incident angle of 60° relative to normal of the laminate 12. Properties (reference laminated values) of the laminate 12 and the reflected radiation 16 may be measured from test apparatus 86.

Using the test apparatus 86, the laminate 12, including the previously-described first ply 22, second ply 28, interlayer 34, and enhanced p-polarized reflective coating 36, may exhibit a luminous transmittance using standard illuminate A (LTA) of at least 70%, as measured according automotive industry standards. Using the test apparatus 86, the laminate 12, including the previously-described first ply 22, second ply 28, interlayer 34, and enhanced p-polarized reflective coating 36, may exhibit a reflectivity of the p-polarized radiation using D65 illuminate and a 10° detector of at least 10%. Using the test apparatus 86, the laminate 12, including the previously-described first ply 22, second ply 28, interlayer 34, and enhanced p-polarized reflective coating 36, may have a total reflectivity of up to 60%, such as up to 55% or up to 52%.

EXAMPLES

The following examples are presented to demonstrate the general principles of the invention. The invention should not be considered as limited to the specific examples presented.

The following examples show enhanced p-polarized reflective coatings according to the present invention alongside several comparative examples. The examples and comparative examples are computer modeled samples reproducible using commercially available software, such as OPTICS (v.6.0) software and WINDOW (v7.3.4.0) software available from Lawrence Berkeley National Laboratory or WVASE software available from J.A. Woollam Co. The enhanced p-polarized reflective coatings were modeled and values calculated having the coatings applied over a surface of a laminate. The laminate was modeled to include two plies of 2 mm clear glass with a 0.76 mm interlayer of polyvinyl butyral (PVB) therebetween. The coating was applied over at least a portion of the third surface, as previously defined, of the laminate.

Table 1 shows the thicknesses of the various layers of the modeled coatings (in angstroms). Not shown in Table 1 are the thicknesses of the sacrificial metal layers modeled directly over top of each respective metal functional layer. The thickness of each sacrificial metal layer ranged between 10-50 angstroms, but any adequate thickness could be selected.

TABLE 1

| Layer | Comp. Ex. 1 | Comp. Ex. 2 | Comp. Ex. 3 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|---|
| Base Layer | 0 | 325 | 419 | 454 | 450 | 422 | 426 | 487 | 442 | 449 | 387 | 406 | 387 | 383 | 427 | 390 |
| First Metal Functional Layer | 0 | 110 | 110 | 66 | 66 | 68 | 68 | 105 | 65 | 123 | 128 | 112 | 128 | 142 | 66 | 126 |
| First Phase Adjustment Layer | 0 | 825 | 684 | 726 | 704 | 689 | 693 | 866 | 721 | 859 | 974 | 1048 | 974 | 879 | 990 | 985 |
| Second Metal Functional Layer | 0 | 78 | 126 | 74 | 74 | 70 | 68 | 68 | 69 | 67 | 66 | 66 | 66 | 69 | 124 | 65 |
| Second Phase Adjustment Layer | 0 | 0 | 768 | 806 | 793 | 817 | 805 | 619 | 808 | 708 | 0 | 0 | 0 | 0 | 0 | 0 |
| Third Metal Functional Layer | 0 | 0 | 135 | 135 | 132 | 126 | 125 | 80 | 127 | 65 | 0 | 0 | 0 | 0 | 0 | 0 |
| Topcoat Layer | 0 | 250 | 383 | 411 | 392 | 408 | 405 | 311 | 401 | 347 | 368 | 359 | 368 | 363 | 346 | 368 |
| Overcoat | 0 | 700 | 700 | 700 | 700 | 700 | 700 | 700 | 700 | 700 | 700 | 700 | 700 | 700 | 700 | 700 |

Comparative Example 1 is an uncoated laminate. Comparative Examples 2 and 3 are commercially available coatings. Examples 1-7 are triple metal functional layer enhanced p-reflective reflective coatings of the present invention which have been optimized to have enhanced p-polarized radiation reflecting properties applied on the laminate. Examples 8-13 are double metal functional layer enhanced p-polarized reflective coatings of the present invention which have been optimized to have enhanced p-polarized radiation reflecting properties applied on the laminate.

From Table 1, for the triple metal functional layer enhanced p-polarized reflective coatings: the base layer was applied directly over the substrate and included a first film directly over the substrate and a second film directly over the first film. The first film included a zinc stannate ($Zn_2SnO_4$) layer. The second film included a zinc oxide layer (which included up to 10 wt. % tin oxide). The first metal functional layer was applied directly over the base layer and was a metallic silver layer. A first sacrificial metal layer was applied directly over the first metal functional layer and was a titanium ($TiO_x$) layer. As previously discussed, the sacrificial metal layers were deposited as metal titanium and all or part of the layer subsequently oxidized during subsequent processing steps. The first phase adjustment layer was applied directly over the first sacrificial metal layer and included a first film, a second film, and a third film. The first film was applied directly over the first sacrificial metal layer and included a zinc oxide layer (which included up to 10 wt. % tin oxide). The second film was applied directly over the first film and included a zinc stannate layer. The third film was applied directly over the second film and included a zinc oxide layer (which included up to 10 weight % tin oxide). A second metal functional layer was applied directly over the first phase adjustment layer and was a metallic silver layer. A second sacrificial metal layer was applied directly over the second metal functional layer and was a titanium ($TiO_x$) layer (like the first sacrificial metal layer). A second phase adjustment layer was applied directly over the second sacrificial metal layer and included a first film, a second film, and a third film. The first film was applied directly over the second sacrificial metal layer and included a zinc oxide layer (which included up to 10 wt. % tin oxide). The second film was applied directly over the first film and included a zinc stannate layer. The third film was applied directly over the second film and included a zinc oxide layer (which included up to 10 wt. % tin oxide). A third metal functional layer was applied directly over the second phase adjustment layer and was a metallic silver layer. A third sacrificial metal layer was applied directly over the third metal functional layer and was a titanium ($TiO_x$) layer (like the first and second sacrificial metal layer). A topcoat layer was applied directly over the third sacrificial metal layer and included a first film and a second film. The first film was applied directly over the third sacrificial metal layer and included a zinc oxide layer (which included up to 10 wt. % tin oxide). The second film was applied directly over the first film and included a zinc stannate layer. An overcoat was applied directly over the topcoat layer and included a combination silica and alumina coating having 85% $SiO_2$ and 15% $Al_2O_3$.

From Table 1, for the double metal functional layer enhanced p-polarized reflective coatings: the base layer was applied directly over the substrate and included a first film directly over the substrate and a second film directly over the first film. The first film included a zinc stannate ($Zn_2SO_4$) layer. The second film included a zinc oxide layer (which included up to 10 wt. % tin oxide). The first metal functional layer was applied directly over the base layer and was a metallic silver layer. A first sacrificial metal layer was applied directly over the first metal functional layer and was a titanium ($TiO_x$) layer. As previously discussed, the sacrificial metal layers were deposited as metal titanium and all or part of the layer subsequently oxidized during subsequent processing steps. The first phase adjustment layer was applied directly over the first sacrificial metal layer and included a first film, a second film, and a third film. The first film was applied directly over the first sacrificial metal layer and included a zinc oxide layer (which included up to 10 wt. % tin oxide). The second film was applied directly over the first film and included a zinc stannate layer. The third film was applied directly over the second film and included a zinc oxide layer (which included up to 10 wt. % tin oxide). A second metal functional layer was applied directly over the first phase adjustment layer and was a metallic silver layer. A second sacrificial metal layer was applied directly over the second metal functional layer and was a titanium ($TiO_x$) layer (like the first sacrificial metal layer). A topcoat layer was applied directly over the second sacrificial metal layer and included a first film and a second film. The first film was applied directly over the second sacrificial metal layer and included a zinc oxide layer (which included up to 10 wt. % tin oxide). The second film was applied directly over the first film and included a zinc stannate layer. An overcoat was applied directly over the topcoat layer and included a combination silica and alumina coating having 85% $SiO_2$ and 15% $Al_2O_3$.

Table 2 shows the calculated results of relevant characteristics, reproducible using the previously-described software.

In Table 2, "P-Rf60-Y" means the reflectivity of the p-polarized radiation using D65 illuminate and a 10° detector from the film side (external side), according to CIE 1964 10° Supplementary Standard Observer. "P-Rg60-Y" means the reflectivity of the p-polarized radiation using D65 illuminate and a 10° detector from the glass side (internal side), according to CIE 1964 10° Supplementary Standard Observer. "LTA" means luminous transmittance using standard illuminate A (LTA). "RfL*", "Rfa*", and "Rfa*" are reflectivity from the film side for color values: L*, a*, b*. L*, a*, and b* which are in accordance with the 1976 CIELAB color system specified by the International Commission on Illumination. The L*, a*, and b* values represent color center point values. "Tsol" means the solar transmittance of the laminate. "RfSol" means solar reflectance of the laminate from the film side.

Clause 3: The laminate of clause 1 or 2, wherein the enhanced p-polarized reflective coating is positioned over at least a portion of the second surface or the third surface.

Clause 4: The laminate of clause 2 or 3, wherein the enhanced p-polarized reflective coating comprises: a base layer positioned over the portion of the at least one of the surfaces; a first metal functional layer positioned over at least a portion of the base layer; an optional first sacrificial metal layer positioned over at least a portion of the first metal functional layer; a first phase adjustment layer positioned over at least a portion of the first sacrificial metal layer; a second metal functional layer positioned over at least a portion of the first phase adjustment layer; a second sacrificial metal layer positioned over at least a portion of the second metal functional layer; a topcoat layer positioned over at least a portion of the second sacrificial metal layer; and an overcoat positioned over at least a portion of the topcoat layer.

Clause 5: The laminate of clause 4, wherein the enhanced p-polarized reflective coating further comprises: a second phase adjustment layer positioned over at least a portion of the second sacrificial metal layer; a third metal functional layer positioned over at least a portion of the second phase adjustment layer; a third sacrificial metal layer positioned over at least a portion of the third metal functional layer; the topcoat layer positioned over at least a portion of the third

TABLE 2

| Measured Value | Comp. Ex. 1 | Comp. Ex. 2 | Comp. Ex. 3 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|---|---|
| P-Rf60-Y | 0.4 | 4.69 | 6.30 | 12.30 | 11.27 | 11.52 | 11.55 | 11.15 | 11.4 | 10.7 | 13.01 | 13.05 | 13.01 | 12.04 | 12.85 | 13.1 |
| P-Rg60-Y | — | 5.21 | 6.12 | 11.29 | 10.35 | 10.91 | 10.93 | 11.52 | — | — | 13.43 | 13.16 | 13.43 | 13.10 | 12.85 | — |
| LTA | 88.4 | 77.63 | 71.89 | 70.45 | 71.28 | 71.23 | 71.26 | 71.18 | 71.5 | 71.5 | 71.68 | 72.35 | 71.68 | 71.38 | 72.31 | 71.7 |
| RfL* | 34.1 | 43.01 | 40.37 | 47.61 | 46.50 | 46.76 | 46.61 | 46.26 | 46.3 | 45.6 | 51.43 | 51.16 | 51.43 | 50.34 | 50.46 | 51.5 |
| Rfa* | −0.8 | −9.03 | −8.12 | −2.77 | −3.68 | −2.52 | −2.33 | 0.13 | −2.0 | 1.5 | −2.42 | −2.29 | −2.42 | −1.75 | −0.51 | −2.2 |
| Rfb* | 0.0 | −4.50 | −0.19 | 3.91 | 3.60 | 2.57 | 4.01 | 2.91 | 4.5 | −1.3 | 0.51 | 1.25 | 0.51 | 0.03 | −1.22 | 0.8 |
| Tsol | 73.3 | 43.6 | 31.6 | 38.4 | 38.6 | 39.8 | 40.1 | 41.4 | 40.1 | 41.3 | 42.9 | 46.2 | 42.9 | 39.5 | 43.9 | 43.4 |
| RfSol | — | 28.2 | 37.2 | 32.0 | 31.7 | 30.3 | 30.0 | 27.6 | — | — | 28.6 | 25.6 | 28.6 | 31.7 | 29.2 | — |

The inventive laminates exhibit enhanced p-polarized radiation reflecting properties, such that the reflectivity of the p-polarized radiation is at least 10%, while maintaining an LTA of at least 70%.

The invention is further described in the following numbered clauses.

Clause 1: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 10%.

Clause 2: The laminate of clause 1, wherein the enhanced p-polarized reflective coating comprises a plurality of layers.

sacrificial metal layer; and the overcoat positioned over at least a portion of the topcoat layer.

Clause 6: The laminate of clause 4 or 5, wherein the base layer comprises: a first film comprising a metal alloy oxide film; and a second film positioned over the first film of the base layer, the second film of the base layer comprising an oxide mixture film.

Clause 7: The laminate of clause 6, wherein the first film of the base layer comprises a zinc/tin alloy oxide, preferably zinc stannate.

Clause 8: The laminate of clause 6 or 7, wherein the second film of the base layer comprises a metal oxide film, preferably zinc oxide.

Clause 9: The laminate of any of clauses 4-8, wherein the first phase adjustment layer and/or the second phase adjustment layer comprises: a first film comprising a metal oxide film; a second film positioned over the first film of the first phase adjustment layer and/or the second phase adjustment layer, the second film of the first phase adjustment layer and/or the second phase adjustment layer comprising a metal-alloy oxide film; and a third film positioned over the second film of the first phase adjustment layer and/or the second phase adjustment layer, the third film of the first phase adjustment layer and/or the second phase adjustment layer comprising a metal oxide film.

Clause 10: The laminate of clause 9, wherein the first film of the first phase adjustment layer and/or the second phase adjustment layer and/or the third film of the first phase adjustment layer and/or the second phase adjustment layer comprises a metal oxide film, preferably zinc oxide.

Clause 11: The laminate of clause 9 or 10, wherein the second film of the first phase adjustment layer and/or the second phase adjustment layer comprises a zinc/tin alloy oxide, preferably zinc stannate.

Clause 12: The laminate of any of clauses 4-11, wherein the first metal functional layer, the second metal functional layer, and/or the third metal functional layer comprises at least one noble or near noble metal, particularly selected from silver, gold, platinum, palladium, osmium, iridium, rhodium, ruthenium, copper, mercury, rhenium, aluminum, and combinations thereof, more preferably metallic silver.

Clause 13: The laminate of any of clauses 4-12, wherein the first metal functional layer, the second metal functional layer, and/or the third metal functional layer comprises metallic silver.

Clause 14: The laminate of any of clauses 4-13, wherein the first sacrificial metal layer, the second sacrificial metal layer, and/or the third sacrificial metal layer comprises at least one of titanium, niobium, tungsten, nickel, chromium, iron, tantalum, zirconium, aluminum, silicon, indium, tin, zinc, molybdenum, hafnium, bismuth, vanadium, manganese, and combinations thereof, preferably titanium.

Clause 15: The laminate of any of clauses 4-14, wherein the first sacrificial metal layer, the second sacrificial metal layer, and/or the third sacrificial metal layer has a thickness in the range of 10-50 angstroms, preferably 20-40 angstroms, more preferably 25-35 angstroms.

Clause 16: The laminate of any of clauses 4-15, wherein the topcoat layer comprises: a first film comprising a metal oxide film; and a second film positioned over the first film of the topcoat layer, the second film of the topcoat layer comprising a metal-alloy oxide film.

Clause 17: The laminate of clause 16, wherein the second film of the topcoat layer comprises a zinc/tin alloy oxide, preferably zinc stannate.

Clause 18: The laminate of clause 16 or 17, wherein the first film of the topcoat layer comprises a metal oxide film, preferably zinc oxide.

Clause 19: The laminate of any of clauses 4-18, wherein the overcoat comprises a combination silica and alumina coating.

Clause 20: The laminate of any of clauses 2-19, further comprising an anti-reflective coating positioned over at least a portion of the first surface or the fourth surface.

Clause 21: The laminate of clause 20, wherein the anti-reflective coating comprises a multi-layer coating having a first metal alloy oxide layer (first layer), a second metal oxide layer (second layer), a third metal alloy oxide layer (third layer), and a metal oxide top layer (fourth layer).

Clause 22: The laminate of any of clauses 1-21, wherein the enhanced p-polarized reflective coating is positioned over at least a portion of the first surface or the fourth surface.

Clause 23: The laminate of any of clauses 1-22, wherein the first ply and the second ply are non-parallel relative to one another.

Clause 24: The laminate of any of clauses 1-23, wherein the interlayer comprises a wedge-shaped interlayer.

Clause 25: The laminate of any of clauses 1-24, wherein the interlayer comprises a coating layer of uniform thickness.

Clause 26: The laminate of any of clauses 1-25, wherein the interlayer comprises polyvinyl butyral (PVB).

Clause 27: The laminate of any of clauses 1-26, wherein, when contacted with the radiation from the radiation source at an angle of 60° relative to normal of the laminate, the laminate exhibits a total reflectivity of up to 60%, preferably up to 55%, more preferably up to 52%.

Clause 28: The laminate of any of clauses 1-27, wherein the laminate comprises an automotive laminate.

Clause 29: A display system for projecting an image comprising: a laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation at an angle of 60° relative to normal of the laminate, the laminate exhibits a luminous transmittance using standard illuminate A (LTA) value of at least 70% and a reflectance of the p-polarized radiation of at least 10%; and a radiation source directed at the laminate, the radiation source emitting radiation comprising p-polarized radiation.

Clause 30: The system of clause 29, further comprising a polarized filter positioned between the light source and the laminate and configured to allow at least a portion of the p-polarized radiation to pass therethrough.

Clause 31: The system of clause 30, wherein the polarized filter filters at least a portion of s-polarized radiation emitted from the radiation source.

Clause 32: The system of clause 31, wherein the polarized filter filters substantially all of the s-polarized radiation emitted from the radiation source.

Clause 33: The system of any of clauses 29-32, wherein, when the radiation source emits the radiation directed at the laminate, an image is projected to an area of an inner side of the laminate.

Clause 34: The system of clause 33, wherein the image is at least one of: a static image or a dynamic image.

Clause 35: The system of clause 33 or 34, wherein the image comprises a color.

Clause 36: The system of any of clauses 29-35, wherein the image comprises an image in a heads-up display.

Clause 37: The system of any of clauses 29-36, wherein the laminate comprises an automotive laminate.

Clause 38: The system of any of clauses 29-37, wherein the enhanced p-polarized reflective coating is positioned over at least a portion of the second surface or the third surface.

Clause 39: The system of clause 38, wherein the enhanced p-polarized reflective coating is positioned over at least a portion of the first surface or the fourth surface.

Clause 40: The system of clause 39, wherein the enhanced p-polarized reflective coating is positioned over at least a portion of the fourth surface and the radiation source directed at the laminate is positioned at an angle relative to the laminate such that the radiation contacts the first surface at an angle substantially equal to a Brewster's angle for a first surface to air interface, or the enhanced p-polarized reflective coating is positioned over at least a portion of the first surface and the radiation source directed at the laminate is positioned at an angle relative to the laminate such that the radiation contacts the fourth surface at an angle substantially equal to a Brewster's angle for an air to fourth surface interface.

Clause 41: The system of any of the clauses 29-40, wherein the enhanced p-polarized reflective coating comprises: a base layer positioned over the portion of the at least one of the surfaces; a first metal functional layer positioned over at least a portion of the base layer; an optional first sacrificial metal layer positioned over at least a portion of the first metal functional layer; a first phase adjustment layer positioned over at least a portion of the first sacrificial metal layer; a second metal functional layer positioned over at least a portion of the first phase adjustment layer; a second sacrificial metal layer positioned over at least a portion of the second metal functional layer; a topcoat layer positioned over at least a portion of the second sacrificial metal layer; and an overcoat positioned over at least a portion of the topcoat layer.

Clause 42: The system of clause 41, wherein the enhanced p-polarized reflective coating further comprises: a second phase adjustment layer positioned over at least a portion of the second sacrificial metal layer; a third metal functional layer positioned over at least a portion of the second phase adjustment layer; a third sacrificial metal layer positioned over at least a portion of the third metal functional layer; the topcoat layer positioned over at least a portion of the third sacrificial metal layer; and the overcoat positioned over at least a portion of the topcoat layer.

Clause 43: The system of clause 41 or 42, wherein the base layer comprises: a first film comprising a metal alloy oxide film; and a second film positioned over the first film of the base layer, the second film of the base layer comprising an oxide mixture film.

Clause 44: The system of clause 43, wherein the first film of the base layer comprises a zinc/tin alloy oxide, preferably zinc stannate.

Clause 45: The system of clause 43 or 44, wherein the second film of the base layer comprises a metal oxide film, preferably zinc oxide.

Clause 46: The system of any of clauses 41-45, wherein the first phase adjustment layer and/or the second phase adjustment layer comprises: a first film comprising a metal oxide film; a second film positioned over the first film of the first phase adjustment layer and/or the second phase adjustment layer, the second film of the first phase adjustment layer and/or the second phase adjustment layer comprising a metal-alloy oxide film; and a third film positioned over the second film of the first phase adjustment layer and/or the second phase adjustment layer, the third film of the first phase adjustment layer and/or the second phase adjustment layer comprising a metal oxide film.

Clause 47: The system of clause 46, wherein the first film of the first phase adjustment layer and/or the second phase adjustment layer and/or the third film of the first phase adjustment layer and/or the second phase adjustment layer comprises a metal oxide film, preferably zinc oxide.

Clause 48: The system of clause 46 or 47, wherein the second film of the first phase adjustment layer and/or the second phase adjustment layer comprises a zinc/tin alloy oxide, preferably zinc stannate.

Clause 49: The system of any of clauses 41-48, wherein the first metal functional layer, the second metal functional layer, and/or the third metal functional layer comprises at least one noble or near noble metal, particularly selected from silver, gold, platinum, palladium, osmium, iridium, rhodium, ruthenium, copper, mercury, rhenium, aluminum, and combinations thereof, more preferably metallic silver.

Clause 50: The system of any of clauses 41-49, wherein the first metal functional layer, the second metal functional layer, and/or the third metal functional layer comprises metallic silver.

Clause 51: The system of any of clauses 41-50, wherein the first sacrificial metal layer, the second sacrificial metal layer, and/or the third sacrificial metal layer comprises at least one of titanium, niobium, tungsten, nickel, chromium, iron, tantalum, zirconium, aluminum, silicon, indium, tin, zinc, molybdenum, hafnium, bismuth, vanadium, manganese, and combinations thereof, preferably titanium.

Clause 52: The system of any of clauses 41-51, wherein the first sacrificial metal layer, the second sacrificial metal layer, and/or the third sacrificial metal layer has a thickness in the range of 10-50 angstroms, preferably 20-40 angstroms, more preferably 25-35 angstroms.

Clause 53: The system of any of clauses 41-52, wherein the topcoat layer comprises: a first film comprising a metal oxide film; and a second film positioned over the first film of the topcoat layer, the second film of the topcoat layer comprising a metal-alloy oxide film.

Clause 54: The system of clause 53, wherein the second film of the topcoat layer comprises a zinc/tin alloy oxide, preferably zinc stannate.

Clause 55: The system of clause 53 or 54, wherein the first film of the topcoat layer comprises a metal oxide film, preferably zinc oxide.

Clause 56: The system of any of clauses 41-55, wherein the overcoat comprises a combination silica and alumina coating.

Clause 57: The system of any of clauses 29-56, further comprising an anti-reflective coating positioned over at least a portion of the first surface or the fourth surface.

Clause 58: The system of clause 57, wherein the anti-reflective coating comprises a multi-layer coating having a first metal alloy oxide layer (first layer), a second metal oxide layer (second layer), a third metal alloy oxide layer (third layer), and a metal oxide top layer (fourth layer).

Clause 59: The system of any of clauses 29-58, wherein the enhanced p-polarized reflective coating is positioned over at least a portion of the first surface or the fourth surface.

Clause 60: The system of any of clauses 29-59, wherein the first ply and the second ply are non-parallel relative to one another.

Clause 61: The system of any of clauses 29-60, wherein the interlayer comprises a wedge-shaped interlayer.

Clause 62: The system of any of clauses 29-61, wherein the interlayer comprises a coating layer of uniform thickness.

Clause 63: The system of any of clauses 29-62, wherein the interlayer comprises polyvinyl butyral (PVB).

Clause 64: The system of any of clauses 29-63, wherein, when contacted with the radiation from the radiation source at an angle of 60° relative to normal of the laminate, the laminate exhibits a total reflectivity of up to 60%, preferably up to 55%, more preferably up to 52%.

Clause 65: The system of any of clauses 29-64, wherein the laminate comprises an automotive laminate.

Clause 66: A method of projecting an image in a heads-up display comprising: providing a laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation at an angle of 60° relative to normal of the laminate, the laminate exhibits a luminous transmittance using standard illuminate A (LTA) value of at least 70% and a reflectivity of the p-polarized radiation of at least 10%; and directing the radiation source emitting the radiation comprising p-polarized radiation at the laminate, such that an image is projected to an area of an inner side of the laminate.

Clause 67: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 5%.

Clause 68: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 5%, with Rfa* in the range of −2 to 2 and Rfb* in the range of −2 to 2.

Clause 69: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 5%, with Rfa* in the range of −2 to 2.

Clause 70: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 5%, with Rfb* in the range of −2 to 2.

Clause 71: A laminate having enhanced p-polarized radiation reflecting properties comprising: a first ply comprising a first surface and a second surface opposite the first surface, wherein the first surface comprises an outer surface of the laminate; a second ply comprising a third surface adjacent the second surface and a fourth surface opposite the third surface, wherein the fourth surface comprises an inner surface of the laminate; an interlayer positioned between the first ply and the second ply; and an enhanced p-polarized reflective coating positioned over at least a portion of at least one of the surfaces of the first ply and/or the second ply, wherein, when contacted with radiation from a radiation source, the radiation comprising p-polarized radiation, at an angle of 60° relative to normal of the laminate, the laminate exhibits a luminous transmittance using standard illuminate A (LTA) value of at least 70% and a reflectivity of the p-polarized radiation of at least 5%, with exterior reflectance less than or equal to 15%.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A laminate having enhanced p-polarized radiation reflecting properties comprising:
    a first ply comprising a first surface and a second surface opposite the first surface, wherein the first surface comprises an outer surface of the laminate;
    a second ply comprising a third surface adjacent the second surface and a fourth surface opposite the third surface, wherein the fourth surface comprises an inner surface of the laminate;
    an interlayer positioned between the first ply and the second ply; and
    an enhanced p-polarized reflective coating positioned over at least a portion of at least one of the surfaces of the first ply and/or the second ply, wherein the enhanced p-polarized reflective coating comprises:
        a base layer positioned over the portion of the at least one of the surfaces;

at least one metal functional layer positioned over at least a portion of the base layer; and
at least one phase adjustment layer positioned over at least a portion of the at least one metal functional layer,
wherein the laminate further comprises an anti-reflective coating, and
wherein the enhanced p-polarized reflective coating increases the amount of p-polarized radiation reflected when compared to a laminate without the coating.

2. The laminate of claim 1, wherein the anti-reflective coating is positioned over at least a portion of the first surface or the fourth surface.

3. The laminate of claim 1, wherein the anti-reflective coating comprises a multi-layer anti-reflective coating having one or more metal alloy oxide layers and one or more metal oxide layers.

4. The laminate of claim 3, wherein the multi-layer anti-reflective coating comprises:
a first layer that is a metal alloy oxide layer;
a second layer that is a metal oxide layer;
a third layer that is a metal alloy oxide layer; and
a fourth layer that is a metal oxide top layer.

5. The laminate of claim 4, wherein the enhanced p-polarized reflective coating is positioned over at least a portion of the second surface and the anti-reflective coating is positioned over at least a portion of the fourth surface.

6. A laminate having enhanced p-polarized radiation reflecting properties comprising:
a first ply comprising a first surface and a second surface opposite the first surface, wherein the first surface comprises an outer surface of the laminate;
a second ply comprising a third surface adjacent the second surface and a fourth surface opposite the third surface, wherein the fourth surface comprises an inner surface of the laminate;
an interlayer positioned between the first ply and the second ply; and
an enhanced p-polarized reflective coating positioned over at least a portion of at least one of the surfaces of the first ply and/or the second ply, wherein the enhanced p-polarized reflective coating comprises:
a base layer positioned over the portion of the at least one of the surfaces;
at least one metal functional layer positioned over at least a portion of the base layer; and
at least one phase adjustment layer positioned over at least a portion of the at least one metal functional layer,
wherein the laminate exhibits a luminous transmittance using standard illuminate A (LTA) value of at least 70% and a reflectivity of the p-polarized radiation of at least 5%, with Rfb* in the range of −2 to 2.

7. The laminate of claim 6, further comprising an anti-reflective coating comprising a multi-layer anti-reflective coating having one or more metal alloy oxide layers and one or more metal oxide layers.

8. The laminate of claim 7, wherein the multi-layer anti-reflective coating comprises:
a first layer that is a metal alloy oxide layer;
a second layer that is a metal oxide layer;
a third layer that is a metal alloy oxide layer; and
a fourth layer that is a metal oxide top layer.

9. The laminate of claim 6, wherein the enhanced p-polarized reflective coating is positioned over at least a portion of the second surface and the anti-reflective coating is positioned over at least a portion of the fourth surface.

10. The laminate of claim 6, wherein the base layer comprises:
a first film comprising a metal alloy oxide film; and
a second film positioned over the first film, of the base layer, the second film of the base layer comprising an oxide mixture film.

11. The laminate of claim 6, further comprising at least one sacrificial layer positioned between the at least one metal functional layer and the at least one phase adjustment layer.

12. A display system for projecting an image comprising:
a laminate having enhanced p-polarized radiation reflecting properties comprising:
a first ply comprising a first surface and a second surface opposite the first surface, wherein the first surface comprises an outer surface of the laminate;
a second ply comprising a third surface adjacent the second surface and a fourth surface opposite the third surface, wherein the fourth surface comprises an inner surface of the laminate;
an interlayer positioned between the first ply and the second ply;
an enhanced p-polarized reflective coating positioned over at least a portion of at least one of the surfaces of the first ply and/or the second ply, wherein the enhanced p-polarized reflective coating comprises:
a base layer positioned over the portion of the at least one of the surfaces;
at least one metal functional layer positioned over at least a portion of the base layer; and
at least one phase adjustment layer positioned over at least a portion of the at least one metal functional layer, and
a radiation source configured to emit radiation directed to the laminate such that an image is projected to an area of an inner side of the laminate;
wherein the laminate further comprises an anti-reflective coating, and
wherein the enhanced p-polarized reflective coating increases the amount of p-polarized radiation reflected when compared to a laminate without the coating.

13. The display system of claim 12, wherein the anti-reflective coating is positioned over at least a portion of the first surface or the fourth surface.

14. The display system of claim 12, wherein the anti-reflective coating comprises a multi-layer anti-reflective coating having one or more metal alloy oxide layers and one or more metal oxide layers.

15. The display system of claim 14, wherein the multi-layer anti-reflective coating comprises:
a first layer that is a metal alloy oxide layer;
a second layer that is a metal oxide layer;
a third layer that is a metal alloy oxide layer; and
a fourth layer that is a metal oxide top layer.

16. The display system of claim 15, wherein the enhanced p-polarized reflective coating is positioned over at least a portion of the second surface and the anti-reflective coating is positioned over at least a portion of the fourth surface.

17. A display system for projecting an image comprising:
a laminate having enhanced p-polarized radiation reflecting properties comprising:
a first ply comprising a first surface and a second surface opposite the first surface, wherein the first surface comprises an outer surface of the laminate;
a second ply comprising a third surface adjacent the second surface and a fourth surface opposite the third surface, wherein the fourth surface comprises an inner surface of the laminate;
an interlayer positioned between the first ply and the second ply;
an enhanced p-polarized reflective coating positioned over at least a portion of at least one of the surfaces of the first ply and/or the second ply, wherein the enhanced p-polarized reflective coating comprises:
a base layer positioned over the portion of the at least one of the surfaces;
at least one metal functional layer positioned over at least a portion of the base layer; and
at least one phase adjustment layer positioned over at least a portion of the at least one metal functional layer, and
a radiation source configured to emit radiation directed to the laminate such that an image is projected to an area of an inner side of the laminate;
wherein the laminate exhibits a luminous transmittance using standard illuminate A (LTA) value of at least 70% and a reflectivity of the p-polarized radiation of at least 5%, with Rfb* in the range of −2 to 2.

18. The display system of claim 17, further comprising an anti-reflective coating comprising a multi-layer anti-reflective coating having one or more metal alloy oxide layers and one or more metal oxide layers.

19. The display system of claim 18, wherein the multi-layer anti-reflective coating comprises:
a first layer that is a metal alloy oxide layer;
a second layer that is a metal oxide layer;
a third layer that is a metal alloy oxide layer; and
a fourth layer that is a metal oxide top layer.

20. The display system of claim 17, wherein the enhanced p-polarized reflective coating is positioned over at least a portion of the second surface and the anti-reflective coating is positioned over at least a portion of the fourth surface.

21. The display system of claim 17, wherein the base layer comprises:
a first film comprising a metal alloy oxide film; and
a second film positioned over the first film, of the base layer, the second film of the base layer comprising an oxide mixture film.

22. The display system of claim 17, further comprising at least one sacrificial layer positioned between the at least one metal functional layer and the at least one phase adjustment layer.

23. The laminate of claim 6, wherein the laminate exhibits a luminous transmittance using standard illuminate A (LTA) value of at least 70% and a reflectivity of the p-polarized radiation of at least 10%, with Rfb* in the range of −2 to 2.

* * * * *